(12) United States Patent
Blume

(10) Patent No.: US 9,416,887 B2
(45) Date of Patent: Aug. 16, 2016

(54) LOW TURBULENCE VALVE

(71) Applicant: George H Blume, Austin, TX (US)

(72) Inventor: George H Blume, Austin, TX (US)

( * ) Notice: Subject to any disclaimer, the term of this patent is extended or adjusted under 35 U.S.C. 154(b) by 373 days.

(21) Appl. No.: 13/899,752

(22) Filed: May 22, 2013

(65) Prior Publication Data

US 2014/0083534 A1 Mar. 27, 2014

Related U.S. Application Data

(63) Continuation-in-part of application No. 13/385,960, filed on Mar. 16, 2012, now Pat. No. 8,915,722, which is a continuation of application No. 12/390,517, filed on Feb. 23, 2009, now Pat. No. 8,147,227, which is a continuation of application No. 11/125,282, filed on May 9, 2005, now Pat. No. 7,513,759, which is a continuation of application No. 10/613,295, filed on Jul. 3, 2003, now Pat. No. 6,910,871, which is a continuation-in-part of application No. 10/288,706, filed on Nov. 6, 2002, now Pat. No. 6,623,259, which is a continuation of application No. 10/139,770, filed on May 6, 2002, now Pat. No. 6,544,012, which is a continuation of application No. 09/618,693, filed on Jul. 18, 2000, now Pat. No. 6,382,940.

(60) Provisional application No. 61/654,468, filed on Jun. 1, 2012, provisional application No. 61/660,963, filed on Jun. 18, 2012.

(51) Int. Cl.

| F16K 21/04 | (2006.01) |
|---|---|
| F16K 1/36 | (2006.01) |
| F16K 15/06 | (2006.01) |
| F04B 15/02 | (2006.01) |
| F04B 53/10 | (2006.01) |

(52) U.S. Cl.
CPC ............... *F16K 21/04* (2013.01); *F04B 15/02* (2013.01); *F04B 53/10* (2013.01); *F16K 1/36* (2013.01); *F16K 15/063* (2013.01); *Y10T 137/85978* (2015.04)

(58) Field of Classification Search
CPC ............ F16K 1/36; F16K 1/38; F16K 1/385; F16K 1/42; F16K 15/00; F16K 15/06; F16K 25/00; F16K 25/05; F16K 47/00; Y10T 137/7868
USPC ............................ 251/332, 324; 137/902, 904
See application file for complete search history.

(56) References Cited

U.S. PATENT DOCUMENTS

| 968,916 | A | * | 8/1910 | Benner | .................. | F01L 1/32 |
|---|---|---|---|---|---|---|
| | | | | | | 123/188.2 |
| 970,249 | A | * | 9/1910 | Mack | .................. | F01L 1/32 |
| | | | | | | 137/332 |
| 1,005,744 | A | * | 10/1911 | O'Brien | .................. | F16K 1/46 |
| | | | | | | 137/902 |
| 1,008,399 | A | * | 11/1911 | Wintz | .................. | F16K 15/12 |
| | | | | | | 137/516.23 |

(Continued)

*Primary Examiner* — Marina Tietjen
(74) *Attorney, Agent, or Firm* — Gary W Hamilton

(57) ABSTRACT

A positive displacement pump fluid end with multiple fluid chambers and each fluid chamber comprising a valve body, valve seal, seat, spring, and external guide. External top male stem guide is integral to the fluid end discharge cover or the suction valve spring retainer. Female guide is internal and integral with the valve body. When the valve opens hydrodynamic forces and moments align the valve to prevent rotation. An embodiment features tapered male and female guide members to further assist in correct alignment of the valve with the seat. Various additional embodiments assist in venting any trapped fluids between the male and female portions of the guide.

14 Claims, 27 Drawing Sheets

(56) References Cited

U.S. PATENT DOCUMENTS

| | | | | |
|---|---|---|---|---|
| 1,045,534 A | * | 11/1912 | ElWell | F16K 15/12 137/516.23 |
| 1,839,403 A | * | 1/1932 | Macfadden | F04B 53/1022 137/533.29 |
| 1,861,420 A | * | 5/1932 | Mahan | F04B 53/1027 137/516.29 |
| 1,947,071 A | | 2/1934 | Walton | |
| 1,948,628 A | | 2/1934 | Penick et al. | |
| 1,960,963 A | * | 5/1934 | Wheeler | F16K 15/06 137/454.2 |
| 1,964,249 A | * | 6/1934 | Chase | F16K 15/025 137/906 |
| 2,019,244 A | * | 10/1935 | Bergesen | F16K 15/08 137/512 |
| 2,023,189 A | * | 12/1935 | Armstrong | F16K 15/026 137/515 |
| 2,079,647 A | * | 5/1937 | Abegg | F04B 53/1025 137/533.21 |
| 2,113,100 A | * | 4/1938 | Thomas | F16K 15/06 137/329.04 |
| 2,116,968 A | * | 5/1938 | Casner | F04B 53/103 137/533.23 |
| 2,236,370 A | | 3/1941 | Jackman | |
| 2,257,417 A | | 3/1941 | Kelly | |
| 2,316,480 A | | 4/1943 | White et al. | |
| 2,918,078 A | | 12/1959 | Cummings | |
| 3,053,500 A | | 9/1962 | Atkinson | |
| 3,070,120 A | | 12/1962 | Wendt | |
| 3,090,596 A | | 5/1963 | Gifford | |
| 3,186,430 A | | 6/1965 | Koutnik | |
| 3,191,617 A | | 6/1965 | Maddox | |
| 3,510,103 A | | 5/1970 | Carsello | |
| 3,598,145 A | | 8/1971 | Wolfson | |
| 3,809,362 A | | 5/1974 | Baumann | |
| 3,905,608 A | | 9/1975 | Olsen et al. | |
| 3,918,481 A | * | 11/1975 | Doe | F16K 17/30 137/504 |
| 4,084,606 A | | 4/1978 | Mittleman | |
| 4,172,465 A | * | 10/1979 | Dashner | F16K 15/063 137/533.27 |
| 4,329,125 A | * | 5/1982 | Chambers | F04B 39/102 137/543.17 |
| 4,373,550 A | | 2/1983 | Yelich | |
| 4,456,440 A | | 6/1984 | Korner | |
| 4,467,703 A | | 8/1984 | Redwine et al. | |
| 4,474,208 A | | 10/1984 | Looney | |
| 4,477,236 A | | 10/1984 | Elliott | |
| 4,508,133 A | | 4/1985 | Hamid | |
| 4,518,329 A | * | 5/1985 | Weaver | F04B 53/1027 137/516.25 |
| 4,527,961 A | | 7/1985 | Redwine et al. | |
| 4,573,886 A | | 3/1986 | Maasberg et al. | |
| 4,696,321 A | | 9/1987 | Reese et al. | |
| 4,714,237 A | | 12/1987 | Linderman et al. | |
| 4,766,927 A | | 8/1988 | Conatser | |
| 4,768,933 A | | 9/1988 | Stachowiak | |
| 4,770,206 A | | 9/1988 | Sjoberg | |
| 4,771,801 A | * | 9/1988 | Crump | F04B 49/121 137/68.26 |
| 4,773,833 A | | 9/1988 | Wilkinson et al. | |
| 4,860,995 A | * | 8/1989 | Rogers | F04B 53/1027 137/516.29 |
| 4,878,815 A | | 11/1989 | Stachowiak | |
| 4,915,354 A | | 4/1990 | Sims et al. | |
| 5,020,809 A | | 6/1991 | Mullaney | |
| 5,060,374 A | | 10/1991 | Findlanl et al. | |
| 5,080,122 A | * | 1/1992 | Neuzeret | F16K 15/063 137/15.18 |
| 5,088,521 A | * | 2/1992 | Johnson | E21B 21/01 137/516.29 |
| 5,145,340 A | * | 9/1992 | Allard | F04B 39/041 277/510 |
| 5,207,242 A | * | 5/1993 | Daghe | E03C 1/106 137/454.6 |
| 5,226,445 A | * | 7/1993 | Surjaatmadja | F16K 15/063 137/516.29 |
| 5,247,960 A | | 9/1993 | Kornfeldt et al. | |
| 5,275,204 A | | 1/1994 | Rogers et al. | |
| 5,375,621 A | * | 12/1994 | Gaehwiler | F16K 15/148 137/220 |
| 5,375,813 A | | 12/1994 | Rozinsky | |
| 5,622,486 A | | 4/1997 | McDuffie et al. | |
| 5,839,468 A | | 11/1998 | Allred | |
| 5,924,853 A | | 7/1999 | Pacht | |
| 6,176,692 B1 | | 1/2001 | Reinartz et al. | |
| 6,241,492 B1 | | 6/2001 | Pacht | |
| 6,264,441 B1 | | 7/2001 | Marioni | |
| 6,267,383 B1 | | 7/2001 | Morvant | |
| 6,298,817 B1 | | 10/2001 | Hoeg | |
| 6,517,049 B2 | | 2/2003 | Coppock | |
| 6,581,626 B2 | * | 6/2003 | Noll | E03B 7/077 137/315.11 |
| 6,623,259 B1 | | 9/2003 | Blume | |
| 7,168,440 B1 | | 1/2007 | Blume | |
| 7,185,671 B2 | * | 3/2007 | Duex | F16K 15/066 137/454.6 |
| 7,364,412 B2 | | 4/2008 | Kugelev et al. | |
| 7,434,593 B2 | * | 10/2008 | Noll | F16K 15/063 137/15.18 |
| 7,909,057 B1 | * | 3/2011 | Vicars | F16J 15/106 137/516.29 |
| 8,915,722 B1 | | 12/2014 | Blume | |
| 2002/0079332 A1 | | 6/2002 | McIntire et al. | |
| 2002/0096217 A1 | * | 7/2002 | Wu | F16K 15/028 137/543.19 |
| 2003/0132415 A1 | | 7/2003 | Chigasaki et al. | |
| 2008/0041439 A1 | | 2/2008 | Achutharaman et al. | |
| 2010/0288959 A1 | * | 11/2010 | Vicars | F16K 15/063 251/324 |
| 2011/0206546 A1 | * | 8/2011 | Vicars | F04B 53/007 417/559 |

\* cited by examiner

Extruded Seal

Area "B-B" of Figure 14A

LOW TURBULENCE VALVE

FIELD OF THE INVENTION

The invention generally concerns high-pressure plunger-type pumps useful, for example, in oil well hydraulic fracturing. More specifically, the invention relates to valves suitable for rapid open-close cycling when pumping abrasive fluids, such as sand slurries at high pressures.

BACKGROUND OF THE INVENTION

Engineers typically design high-pressure oil field plunger pumps in two sections; the (proximal) power section and the (distal) fluid section. The power section usually comprises a crankshaft, reduction gears, bearings, connecting rods, crossheads, crosshead extension rods, etc. The power section is commonly referred to as the power end by the users and hereafter in this application. The fluid section is commonly referred to as the fluid end by the users and hereafter in this application. Commonly used fluid sections usually comprise a plunger pump housing having a suction valve in a suction bore, a discharge valve in a discharge bore, an access bore, and a plunger in a plunger bore, plus high-pressure seals, retainers, etc. FIG. 1 is a cross-sectional schematic view of a typical fluid end showing its connection to a power end by stay rods. FIG. 1 also illustrates a fluid chamber which is one internal section of the housing containing the valves, seats, plungers, plunger packing, retainers, covers, and miscellaneous seals previously described. A plurality of fluid chambers similar to that illustrated in FIG. 1 may be combined, as suggested in the Triplex fluid end housing schematically illustrated in FIG. 2. It is common practice for the centerline of the plunger bore and access bore to be collinear. Typically in the prior art, the centerlines of the plunger bore, discharge bore, suction bore, and access bore are all arranged in a common plane. The spacing of the plunger bores, plungers, plunger packing, and plunger gland nut within each fluid chamber is fixed by the spacing of the crank throws and crank bearings on the crankshaft in the power end of the pump.

Valve terminology varies according to the industry (e.g., pipeline or oil field service) in which the valve is used. In some applications, the term "valve" means just the valve body, which reversibly seals against the valve seat. In other applications, the term "valve" includes components in addition to the valve body, such as the valve seat and the housing that contains the valve body and valve seat. A valve as described herein comprises a valve body and a corresponding valve seat, the valve body typically incorporating an elastomeric seal within a peripheral seal retention groove.

Valves can be mounted in the fluid end of a high-pressure pump incorporating positive displacement pistons or plungers in multiple cylinders. Such valves typically experience high pressures and repetitive impact loading of the valve body and valve seat. These severe operating conditions have in the past often resulted in leakage and/or premature valve failure due to metal wear and fatigue. In overcoming such failure modes, special attention is focused on valve sealing surfaces (contact areas) where the valve body contacts the valve seat intermittently for reversibly blocking fluid flow through a valve.

Valve sealing surfaces are subject to exceptionally harsh conditions in exploring and drilling for oil and gas, as well as in their production. For example, producers often must resort to "enhanced recovery" methods to insure that an oil well is producing at a rate that is profitable. And one of the most common methods of enhancing recovery from an oil well is known as fracturing. During fracturing, cracks are created in the rock of an oil bearing formation by application of high hydraulic pressure. Immediately following fracturing, a slurry comprising sand and/or other particulate material is pumped into the cracks under high pressure so they will remain propped open after hydraulic pressure is released from the well. With the cracks thus held open, the flow of oil through the rock formation toward the well is usually increased.

The industry term for particulate material in the slurry used to prop open the cracks created by fracturing is the propend. And in cases of very high pressures within a rock formation, the propend may comprise extremely small aluminum oxide spheres instead of sand. Aluminum oxide spheres may be preferred because their spherical shape gives them higher compressive strength than angular sand grains. Such high compressive strength is needed to withstand pressures tending to close cracks that were opened by fracturing. Unfortunately, both sand and aluminum oxide slurries are very abrasive, typically causing rapid wear of many component parts in the positive displacement plunger pumps through which they flow. Accelerated wear is particularly noticeable in plunger seals and in the suction (i.e., intake) and discharge valves of these pumps.

A valve (comprising a valve body and valve seat) that is representative of an example full open design valve and seat for a fracturing plunger pump is schematically illustrated in FIG. 3. FIG. 4 shows how sand and/or aluminum oxide spheres may become trapped between seating surface of valve body and seating surface of valve seat as the suction valve closes during the pump's pressure stroke.

The valve of FIG. 3 is shown in the open position. FIG. 4 shows how accelerated wear begins shortly after the valve starts to close due to back pressure. For valve, back pressure tends to close the valve when downstream pressure exceeds upstream pressure. For example, when valve is used as a suction valve, back pressure is present on the valve during the pump plunger's pressure stroke (i.e., when internal pump pressure becomes higher than the pressure of the intake slurry stream. During each pressure stroke, when the intake slurry stream is thus blocked by a closed suction valve, internal pump pressure rises and slurry is discharged from the pump through a discharge valve. For a discharge valve, back pressure tending to close the valve arises whenever downstream pressure in the slurry stream (which remains relatively high) becomes greater than internal pump pressure (which is briefly reduced each time the pump plunger is withdrawn as more slurry is sucked into the pump through the open suction valve).

When back pressure begins to act on a valve, slurry particles become trapped in the narrow space that still separates the sealing surfaces of the valve body and seat. This trapping occurs because the valve is not fully closed, but the valve body's elastomeric seal has already formed an initial seal against the valve seat. The narrow space shown in FIG. 4 between metallic sealing surfaces of the valve body and valve seat is typically about 0.040 to about 0.080 inches wide; this width (being measured perpendicular to the sealing surfaces of the valve body and seat) is called the standoff distance. The size of the standoff distance is determined by the portion of the valve body's elastomeric seal that protrudes beyond the adjacent valve body sealing surfaces to initially contact, and form a seal against, the valve seat. As schematically illustrated in FIG. 4, establishment of this initial seal by an elastomeric member creates a circular recess or pocket that tends to trap particulate matter in the slurry flowing through the valve.

Formation of an initial seal as a valve is closing under back pressure immediately stops slurry flow through the valve. Swiftly rising back pressure tends to drive slurry backwards through the now-sealed valve, but since back-flow is blocked by the initial valve sealing, pressure builds rapidly on the entire valve body. This pressure acts on the area of the valve body circumscribed by its elastomeric seal to create a large force component tending to completely close the valve. For example, a 5-inch valve exposed to a back pressure of 15,000 pounds per square inch will experience a valve closure force that may exceed 200,000 pounds.

The large valve closure force almost instantaneously drives the affected valve, whether suction or discharge, to the fully closed position where the metal sealing surface of the valve body contacts the corresponding metal sealing surface of the valve seat. As the valve body moves quickly through the standoff distance toward closure with the valve seat, the elastomeric seal insert is compressed, thus forming an even stronger seal around any slurry particles that may have been trapped between the seal insert and the valve seat.

Simultaneously, the large valve closure force acting through the standoff distance generates tremendous impact energy that is released against the slurry particles trapped between the metallic sealing surfaces of the valve body and the valve seat. As shown in FIG. 4, the slurry particles that are trapped between approaching valve seating surfaces are crushed.

In addition to the crushing action described above, slurry particles are also dragged between the valve sealing surfaces in a grinding motion. This grinding action occurs because valve bodies and seats are built with complementary tapers on the sealing surfaces to give the valve a self-alignment feature as the valve body closes against the seat. As the large valve closing force pushes the valve body into closer contact with the seat, the valve body tends to slide down the sealing surface taper by a very small amount. Any crushed slurry particles previously trapped between the sealing surfaces are then ground against these surfaces, resulting in extreme abrasive action.

Extrusion of the elastomeric valve insert seal is also a major factor influencing the performance of valves and seats for high-pressure oil field plunger pumps when pumping sand slurries. FIG. 3 schematically illustrates a cross-section of a typical high-pressure pump valve comprising a valve seat with a corresponding valve body having a peripheral elastomeric valve insert seal. As the valve of FIG. 3 closes, FIG. 4 schematically shows that the elastomeric seal in a peripheral seal retention groove contacts the valve seat while the valve body's impact area is still separated from the valve seat by a gap (identified herein as the extrusion gap). Trapped sand or propend particles from the pumped fluid are schematically illustrated in the extrusion gap in FIG. 4. FIGS. 5A and 5B also show the trapped sand or propend particles in the extrusion gap, as well as a portion of the peripheral elastomeric seal that has extruded into the gap. Extrusion of the peripheral elastomeric seal into the gap typically occurs due to high back pressure acting on the seal. High back pressure also tends to quickly close the valve body against the valve seat, thus closing the gap. But particulate matter in the pumped fluid that is trapped in the gap between the impact area of the valve body and the valve seat may prop the gap open.

During valve closure the elastomeric seal typically seals against the valve seat slightly before contact of the valve body impact area and the valve seat. Extrusion of seal elastomer into the extrusion gap thus begins while the valve body impact area is approaching the valve seat. If the extrusion gap is prevented from completely closing by trapped particulate matter, seal extrusion becomes more severe as back pressure on the valve increases (see FIGS. 5A and 5B). Such extrusion leads to weakening and tearing of the seal elastomer, causing extrusion damage (see FIG. 6), seal failure and premature valve failure.

Typically the motion of the valve body is controlled by valve guide legs attached to the bottom or upstream side of the valve body as shown in FIG. 3. Unfortunately these guide legs are another source of accelerated valve and seat failure when pumping high sand slurry concentrations. FIG. 7A illustrates an old style valve design, circa 1970, in which the valve legs are forged into the upstream side of the valve body; typical of a Mission Service Master I design. FIG. 7B illustrates the slurry flow patterns around the leg; as can be seen in the figure, the downstream side of the legs generates considerable turbulence in the flow. The swirling turbulence in the sand slurry used in typical fracturing work results in sever abrasion of the metal valve body and the elastomeric insert seal, which quickly damages the seal, resulting in seal failure. Once the seal fails on the valve insert, the high pressure fluid on the downstream side of the valve escapes through the seal failure to the low pressure upstream side of the valve. Travelling from the very high pressure to the very low pressure side of the valve results in extreme velocities of the sand slurry, which rapidly erodes the metal valve body and the guide legs in the slurry's path; many times destroying the entire valve leg. Engineers typically recognize the beginning of this failure by four (4) erosion marks behind each leg on worn valves removed from the pump just prior to catastrophic failure in which one or more of the valve legs are completely destroyed by the high pressure erosion. The abraded seal and erosion of the metal valve body are also illustrated in FIG. 7B.

The development of the Roughneck valve design, circa 1983, and later the Mission Service Master II valve or the Novatech valve shown in FIG. 8A greatly improved the flow behind the legs. These designs featured streamlined legs which were achieved by inertia welding an investment guide leg casting to the valve body forging. The streamlined legs and the open area below the valve body and downstream of the guide legs eliminated much of the turbulence behind the guide legs. However in severe pumping environments with high pump rates and high slurry concentrations the problem described in the previous paragraph still existed as evidenced by the four (4) erosion marks and destroyed guide legs. FIG. 8B is a picture of the state of the art valve damaged by seal failure and severe erosion behind the guide legs.

The most obvious solution to the problem described above is the removal of the guide legs and somehow guide the motion of the valve by other means. Top stem valves, illustrated in FIGS. 9A, 9B, and 10, attempt this solution. A similar top Stem Valve is illustrated in U.S. Pat. No. 6,698, 450. However top stem design valves are inherently unstable in the open position. Once pushed off center by hydraulic flow as illustrated in FIG. 11A, the forces on the valve tend to push the valve further off center. As the valve continues its cyclic repeating opening and closing, the sliding forces cause rapid and accelerating wear on the top stem guide.

The problem of instability is best visualized by comparing a top stem guided valve to the arrow of a weather vane. A weather vane rotates around a pivot point. On a weather vane stabilizing moment is generated by the aerodynamic force on the tail fin multiplied by the moment arm measured from the pivot point to center of the aerodynamic force. This stabilizing force is countered by a destabilizing moment generated by the aerodynamic force on the arrow tip at the front of the vane multiplied by the moment arm measured from the pivot point to center of the force on the arrow. The weather vane always points into the direction of the flow (wind) because there is always more moment or stabilizing force from the tail fins behind the pivot point than moment in front of the pivot point. If the pivot point were moved to the very front or tip of the arrow, then the vane would be extremely stable. Conversely, if the pivot point were moved to the extreme rear of the arrow the vane would be extremely unstable in a fluid flow. Furthermore, if the vane pivots at the rear and as a consequence the vane moves off center to the flow, the vane will move 180 degrees in the flow. Analogizing this to valve in fluid flow, without guidance, the valve would tumble and never close properly.

While weather vanes typically use fins to stabilize the vane, conical or cylindrical surfaces at the rear of the vane would function similarly to fins on a typical weather vane. Valves do not have vanes parallel to flow as do weather vanes; however valves do have conical and cylindrical surfaces with the axis of these surfaces parallel to the flow. The bottom conical valve surface can function to stabilize the valve in fluid flow depending on the location of the pivot point. Compare the bottom surface of a similar body, the Apollo Space Capsules. These capsules have a similar shaped body to a valve without guide legs.

FIG. 10 is a partial cross-section schematically illustrating discharge valve body in its closed position (i.e., with peripheral elastomeric seal held in symmetrical contact with valve seat by discharge valve spring). Note that top guide stem of discharge valve body is aligned in close sliding contact with top valve stem guide.

FIG. 11A illustrates flow around the discharge valve when the valve is in the fully open position, immediately after first opening of the valve. However there are hydrodynamic forces on the valve from the flow which is making a significant change in direction in order to exit through the discharge manifold. These forces quickly move the valve to a position illustrated in FIG. 11B. As shown in FIG. 11B, the valve moves downstream in the flow however the valve's movement is limited by the valve stem guide in which the valve's top stem translates. The valve in turn rotates around the pivot point which is the circumferential edge at the bottom of the valve guide. Because the pivot point is above the area on which the hydrodynamic forces act, the valve is continuously pushed off center. FIG. 11C is the side view of the valve illustrating the area of the valve on which the hydrodynamic forces act, where A1 is the side area of the valve subjected to hydrodynamic forces that would stabilize the valve and A2 is the side area of the valve subjected to forces that would destabilize the valve in fluid flow around the valve. Because the pivot point is above the area on which the hydrodynamic forces act, the valve is continuously pushed off center. The destabilizing moment is equal to the product of the side area of the valve, A2, multiplied by the length of the destabilizing arm or Arm 2 which is measured from the centroid of the area CT2 to the pivot point. As there is no area, A1, above the pivot point, CT1 does not exist, then the stabilizing arm length Arm 1 equals zero and the product of A1 times Arm 1 equals zero; the stabilizing moment then also equals zero. Thus top stem guided valves act similar to a weather vane in which the pivot point is positioned at the rear of the vane. Expressed mathematically:

$A1 \times Arm\ 1 = 0 < A2 \times Arm\ 2.$

FIG. 11D schematically illustrates how misalignment of top guide stem is possible with excessive wear of top valve stem guide. Such excessive wear can occur because discharge valve body, including top guide stem, is typically made of steel that has been carburized to a hardness of about 60 Rockwell C. In contrast, the wall of top valve stem guide, which is shown in FIG. 11 as being formed within discharge cover, is typically made of mild alloy steel with a hardness of about 30 Rockwell C. Thus the softer wall of stem guide is worn away by sliding contact with the harder guide stem. This wear is accelerated by side loads on valve body that result when fluid flowing past the valve body changes its direction of flow into the discharge manifold. Analogous side loads would be present on a suction valve when fluid flowing past the valve body changes its direction of flow into the plunger cavity.

Eventually, top valve stem guide can be worn sufficiently to allow discharge valve leakage due to significant asymmetric contact of elastomeric seal with valve seat as schematically illustrated in FIG. 12. This problem of stem guide wear is typically addressed in practice through use of a replaceable bushing having a modified top valve stem guide (see the schematic illustration in FIG. 13). Bushing is commonly made of a plastic such as urethane, or a wear and corrosion-resistant metal such as bronze. Such bushings require periodic checking and replacement, but these steps may be overlooked by pump mechanics until a valve fails prematurely.

When the open valve is badly misaligned and the valve guide is badly worn there are not aligning forces available to properly align the valve as it closes. Thus the valve will close against the seat in a miss-aligned or cocked position as shown in FIG. 12. In this position, the side of the cocked valve leaves an extrusion gap that results in shorten valve insert seal life. The cocked valve also results in uneven loading of the metal valve body against the seating surface of the seat resulting in accelerated metal wear on the valve body and seat.

SUMMARY OF THE INVENTION

The present invention addresses both the problem of premature valve failures in high pressure fracturing pumps due to turbulent flow around the guide legs and instability in top stem guided valves. The present invention features a conical shape on the upstream side of the valve body for improved flow. Elimination of guide legs prevents turbulence that damages the valve insert seal. Rather than guide the valve with external lower guides or upper stem guides, the valve of the present invention is internally guided by a female guide internal to the valve body. As said valve translates between the closed and open position, an external male guide member acting against the female guide member functions to guide and stabilize the valve. Male guide member is integral to either the discharge cover or suction valve spring retainer members of the fluid end. Valves of the present invention are most often fitted in plunger pumps, however said valves may also be used in all positive displacement pumps fitted with a reciprocating plunger, piston, or diaphragm.

FIG. 14A schematically illustrates a cross-section of a right-angular plunger pump with valves of the present invention. FIG. 14B schematically illustrates area "B-B" of FIG. 14A and the discharge valve, seat, spring, and valve guide of the present invention with the valve in the closed position. Valve body is guided by an inverted male top stem in which the stem is integral with the suction valve spring retainer or the discharge cover. The present invention includes a valve guide internal to the valve body which is a blind hole on the downstream side of the valve body. When the valve first opens during normal cyclic operation, the valve is forced against the stem by hydrodynamic forces from the pumped fluid as shown in FIG. 15A. FIG. 15A also shows the valve attempting to rotate around the pivot point. However unlike top stem guided valves previously described the pivot point on the valve of the present invention is located well below the center of area on which the hydrodynamic forces act as shown in FIG. 15B, where A3 is the side area of the valve subjected to hydrodynamic forces that would stabilize the valve and A4 is the side area of the valve subjected to forces that would destabilize the valve in fluid flow around the valve. The stabilizing moment is calculated by multiplying the length of the stabilizing arm, Arm 3 by the area above the pivot point, A3. The stabilizing arm is the distance from the pivot point to the centroid CT3 of the area A3. The destabilizing moment is the product of the destabilizing area A4 multiplied by the length of the destabilizing arm, Arm 4, which is measured from the pivot point to the centroid CT4 of the area A4. FIG. 15B illustrates that the stabilizing moment is greater than the destabilizing moment when the valve of the present invention first opens or:

$$A3 \times \text{Arm } 3 > A4 \times \text{Arm} 4.$$

Compared to the unstable valve of FIGS. 11B and 11C, the valve of FIGS. 15A and 15B has a stabilizing moment that exceeds the destabilizing moment.

FIG. 15A illustrates some initial rotation of the valve around the pivot point when the valve first opens, however the rotation ceases as the valve opens to the fully open position, thus further increasing the hydrodynamic forces on the valve and increasing the stabilizing moment. As the valve fully opens as illustrated in FIG. 16A, the stabilizing moment as shown in FIG. 16B increases compared to the destabilizing moments. When the valve is fully open the valve is now correctly aligned and the valve's centerline is parallel with the seat centerline. In FIG. 16B area A5 is the side area of the valve subjected to hydrodynamic forces that would stabilize the valve and A6 is the side area of the valve subjected to forces that would destabilize the valve in fluid flow around the valve. The stabilizing moment, calculated by multiplying the length of the stabilizing arm, Arm 5 by the area above the pivot point A5, increases. The stabilizing arm Arm 5 is the distance from the pivot point to the centroid CT5 of the area A5. The destabilizing moment is the product of the destabilizing area A6 multiplied by the length of the destabilizing arm, Arm 6, which is measured from the pivot point to the centroid CT6 of the area A6. FIG. 16B illustrates that the stabilizing moment is greater than the destabilizing moment when the valve of the present invention reaches the fully open position, expressed mathematically:

$$A5 \times \text{Arm } 5 >> A6 \times \text{Arm } 6.$$

Note that the net stabilizing moment is now greater than the net stabilizing moment of the valve of FIGS. 15A and 15B. When the valve of FIG. 16B closes all fluid flow has abated, thus non-symmetrical forces to move the valve out-of-alignment with the seat are eliminated; the valve then closes in alignment with the seat.

Because of the solid particles in slurry fluids, there must be sufficient clearance between the guide members of any valve assembly. Without sufficient clearance, solid particles become trapped and lodged between the guide members of the assembly. These trapped particles can then hold the valve open and prevent closure which would then prevent the pump from pumping. This clearance results in some misalignment between the valve and seat regardless of design. In the present invention, this misalignment can be minimized by utilizing tapered male and female components of the guide assembly as illustrated in FIGS. 17, 18A and 18B. FIG. 17 illustrates the present invention with tapered male and female guide members and the valve in the closed position. The amount of clearance between the male and female guide components illustrated in FIG. 17 is typical of the clearance between guide members of valve designs of the prior art. When the valve of FIG. 17 opens as illustrated in FIG. 18A, the tapered male and female guide members move act to move the valve into closer alignment with the male guide member and the seat. Any misalignment between the valve and seat is corrected by the converging tapered male and female guide components. Should solid particles become trapped between the mating tapered surfaces as the valve reaches the full open valve position, the large force from the full compressed spring will force the valve closed freeing any trapped particles as the space opens between the tapered surfaces.

As illustrated in FIG. 18B area A7 is the side area of the valve subjected to hydrodynamic forces that would stabilize the valve and A8 is the side area of the valve subjected to forces that would destabilize the valve in fluid flow around the valve. The stabilizing moment, calculated by multiplying the length of the stabilizing arm Arm 7 by the area above the pivot point A7, increases. The stabilizing arm is the distance from the pivot point to the centroid CT7 of the area A7. The destabilizing moment is the product of the destabilizing area A8 multiplied by the length of the destabilizing arm, Arm 8, which is measured from the pivot point to the centroid CT8 of the area A8. FIG. 18B illustrates that the net stabilizing moment is greater than the net stabilizing moments of valves of FIGS. 15B and 16B. The greater net stabilizing moment is expressed mathematically:

$$A7 \times \text{Arm } 7 >>> A8 \times \text{Arm} 8.$$

The combination of the low pivot point and the tapered male and female components of the present invention serve to keep the valve from rotating and keep the valve in proper alignment through the opening and closing movement of the valve during normal pumping operations.

An alternate embodiment of the invention features an internal guide bushing made from a low friction material such as Nylon or other plastic materials. The guide bushing may be cast-in-place in the valve body as described in the applicants U.S. Pat. No. 7,168,440. The guide bushing further may contain flutes or longitudinal grooves on the internal portion of the guide to relieve any trapped fluids that would impede the opening or closing of the valve. Flutes or grooves further prevent sand particles from becoming wedged between the male and female portion of the guide and thus preventing the valve from normal opening or closing operation.

In a further embodiment of the invention, the stem guide may also contain a coaxial hole vented to relieve any trapped fluids that would impede the opening or closing of the valve. In a further embodiment of the invention, a conical spring is fitted around a boss at the base of the stem guide and also fitted inside an integral ring on top of the valve. The close fit of the conical spring serves to provide support for the guidance for the reciprocal motion of the valve of this invention along a predetermined axis. Conical spring provides a biasing force to force said valve toward a closed position with said valve seat.

DETAILED DESCRIPTION

Figure 1:
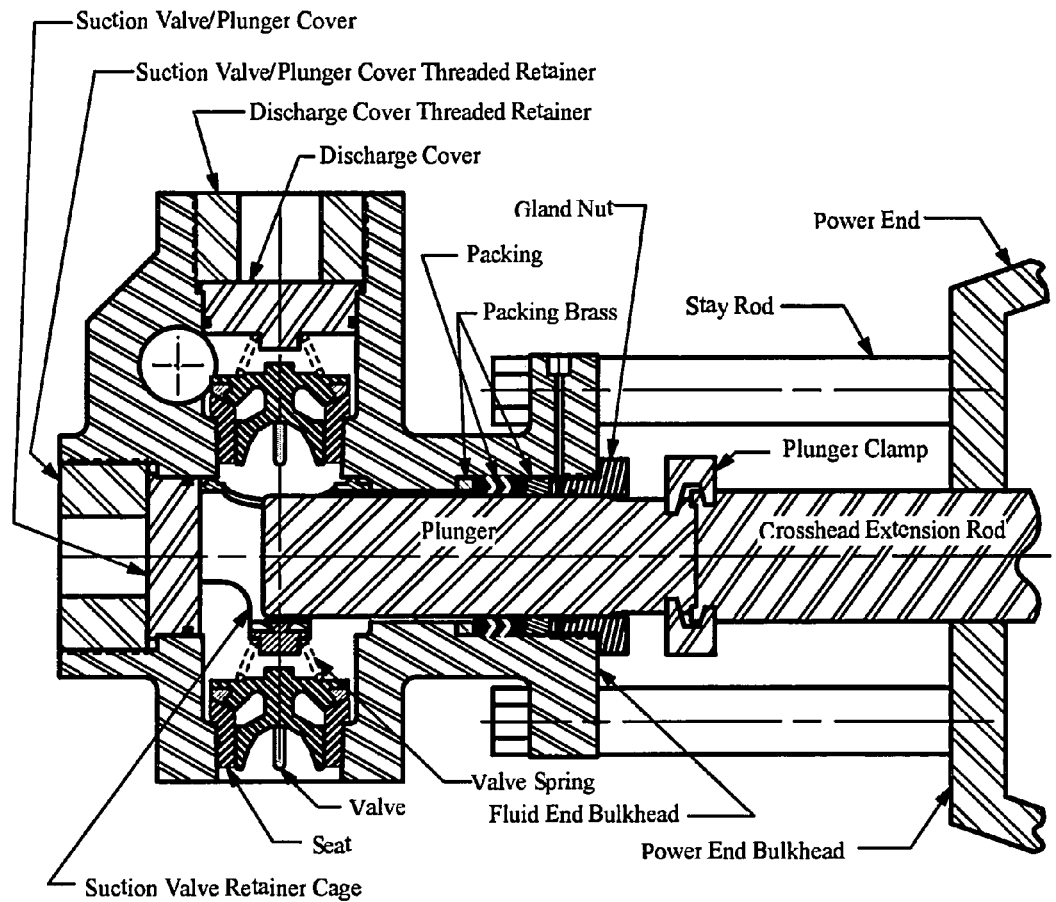
FIG. 1 is a cross-sectional schematic view of a typical plunger pump fluid section showing its connection to a power section by stay rods.
Figure 2C:
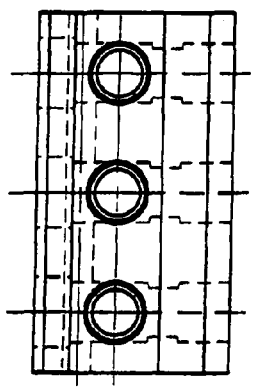
FIG. 2C is the top projected view of the fluid end housing of FIG. 2A.
Figure 2B:
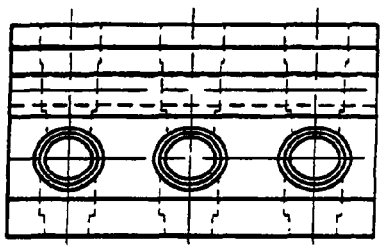
FIG. 2B is the front projected view of the fluid end housing of FIG. 2A.
Figure 2A:
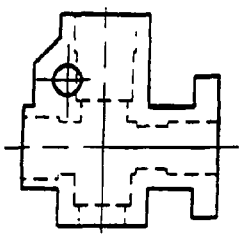
FIG. 2A is an exterior view of the fluid end housing shown in a sectional view in FIG. 1.
Figure 2D:
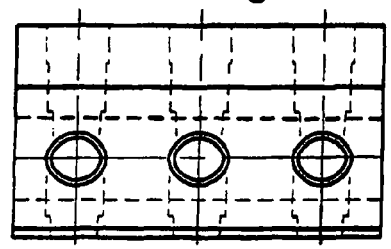
FIG. 2D is the rear projected view of the fluid end housing of FIG. 2A.
Figure 3:
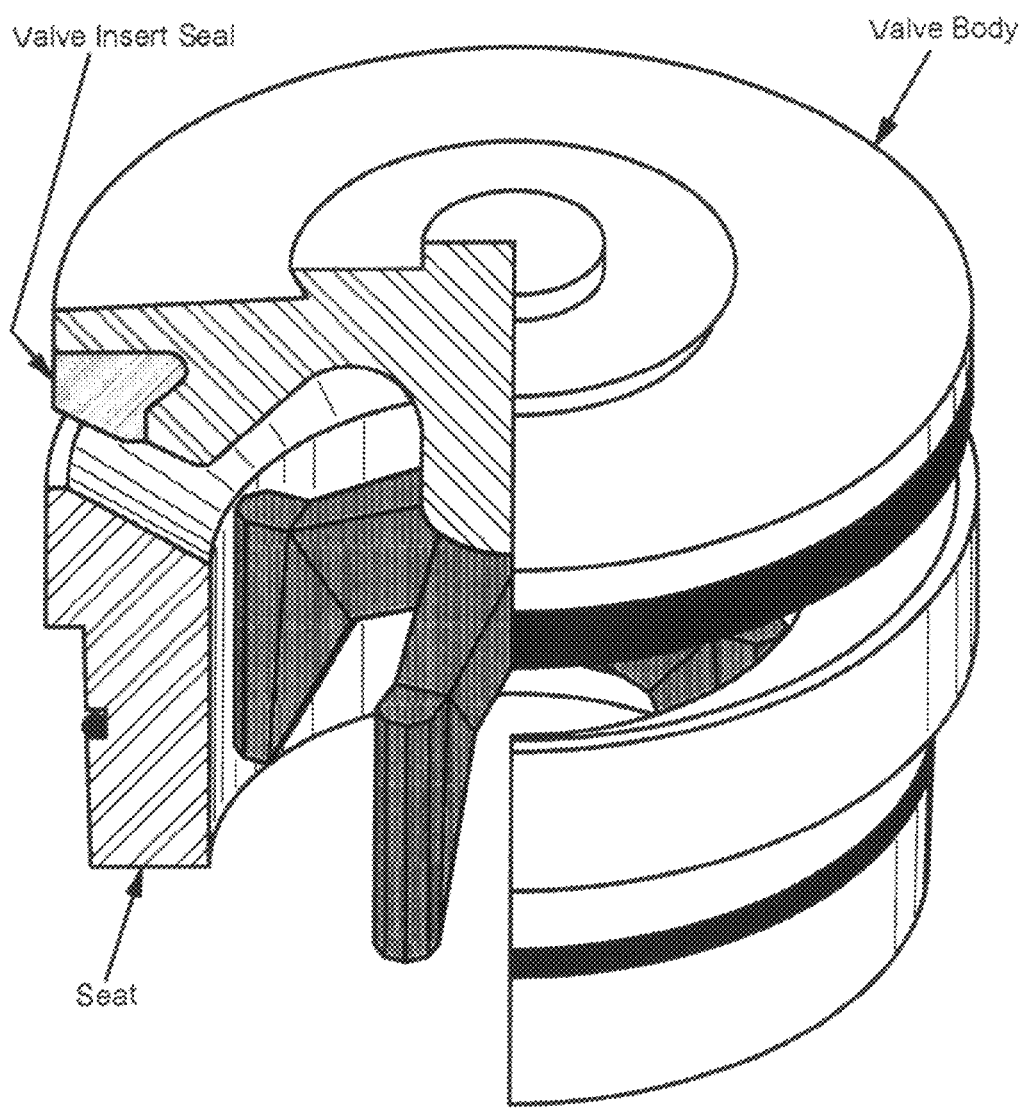
FIG. 3 schematically illustrates a cross-section of a typical high-pressure pump valve comprising a valve body and a corresponding valve seat.
Figure 4:
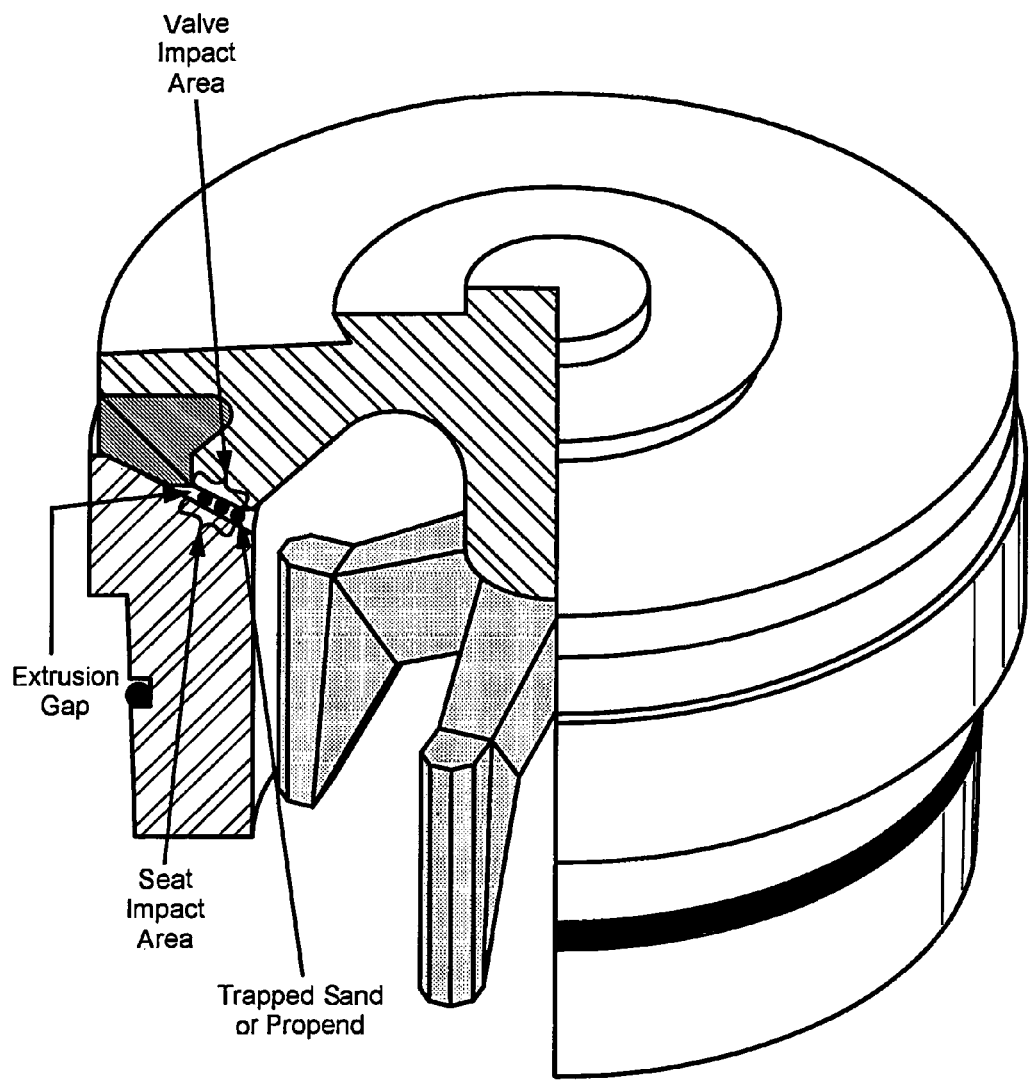
FIG. 4 schematically illustrates the formation of an extrusion gap as the valve of FIG. 3 closes.
Figures 5A, 5B:
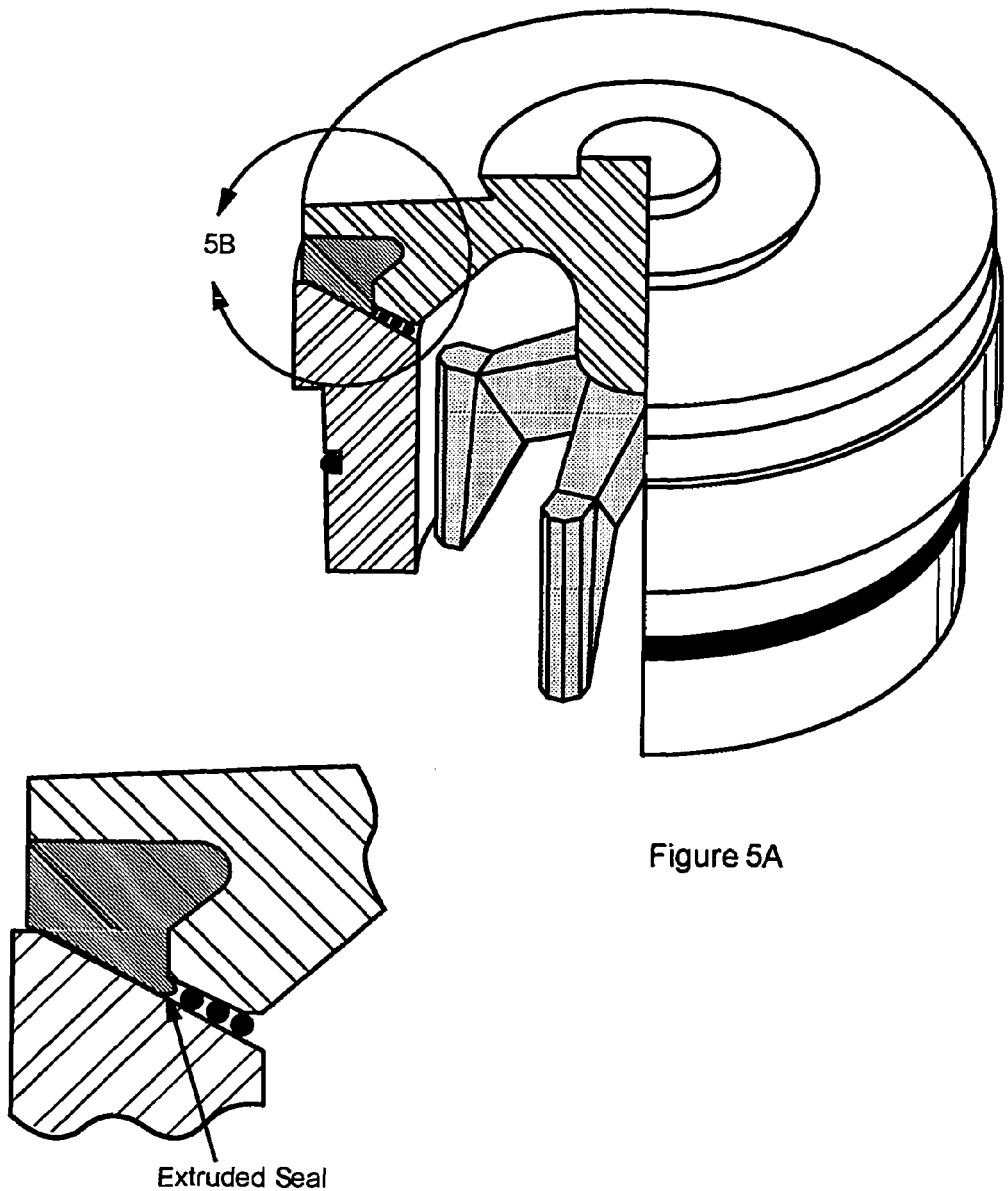
FIG. 5A schematically illustrates extrusion of seal elastomer into the extrusion gap shown in FIG. 4, the gap being held open by particulate matter trapped between the valve body impact area and the valve seat.
FIG. 5B schematically illustrates an enlargement of the area indicated in FIG. 5A.
Figure 6:
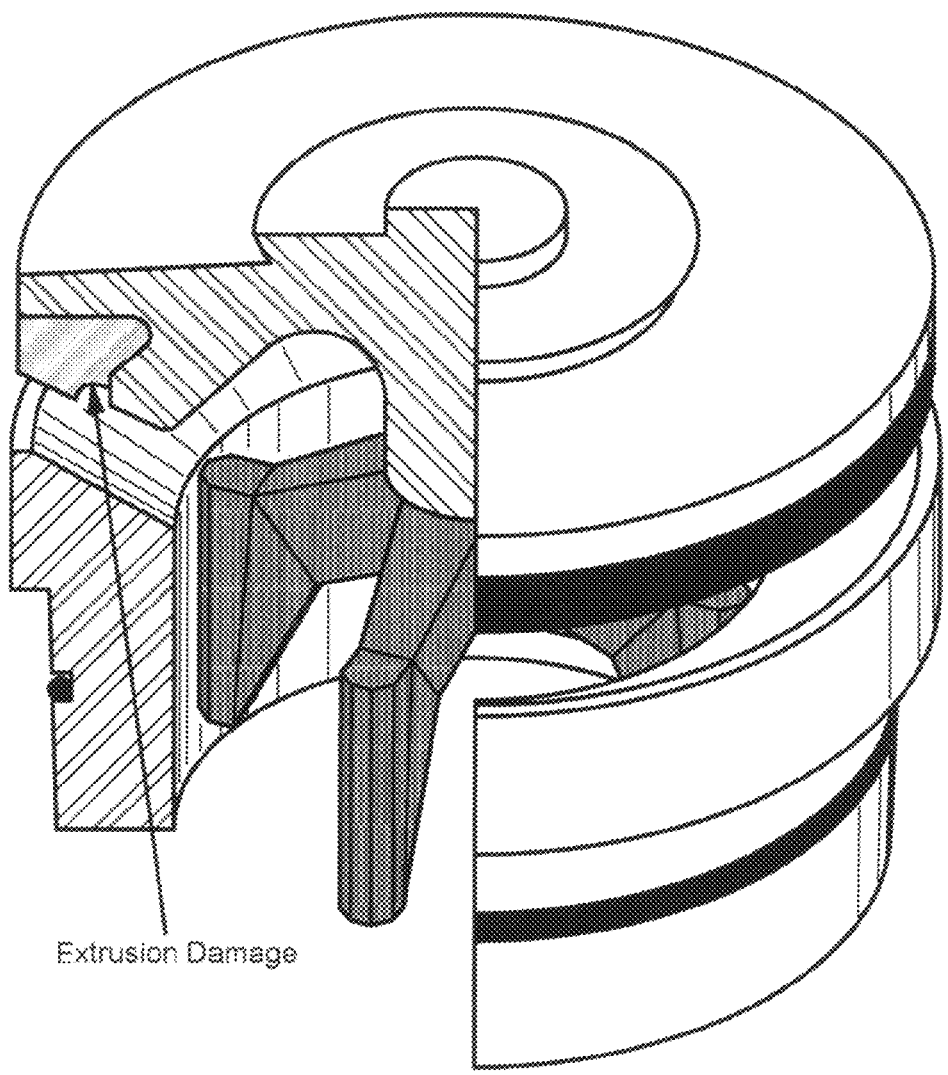
FIG. 6 schematically illustrates seal extrusion damage caused by tearing of the extruded seal as shown in FIGS. 5A and 5B.
Figure 7A:
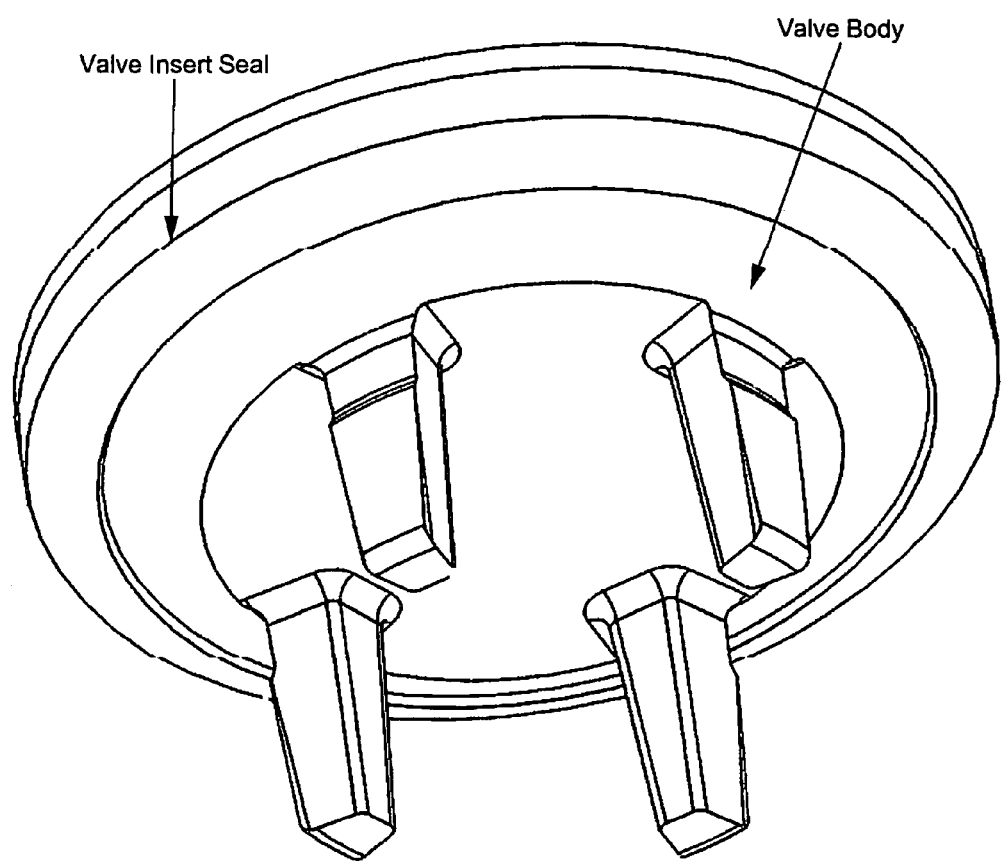
FIG. 7A schematically illustrates a valve body design in which the legs are forged into the main valve body.
Figure 7B:
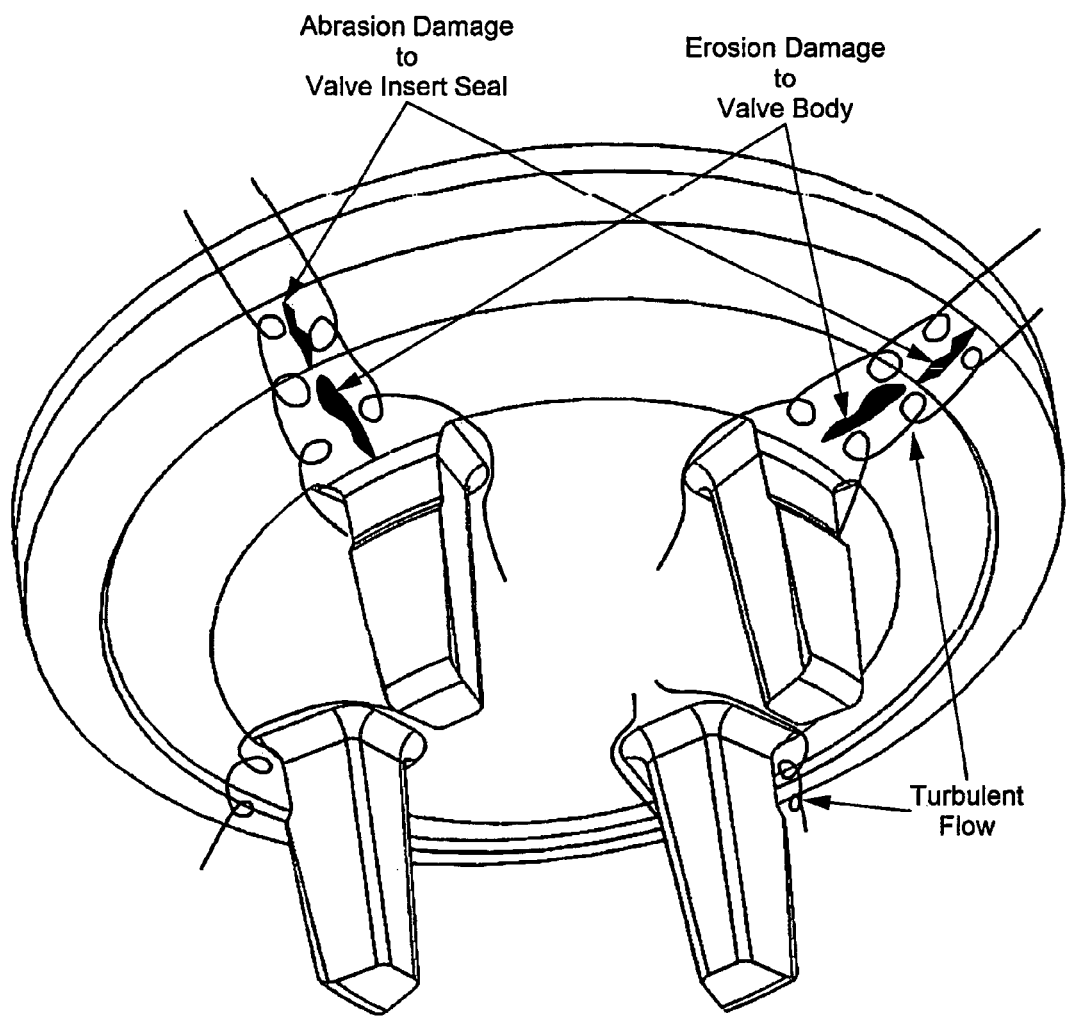
FIG. 7B schematically illustrates the valve of FIG. 7A and the flow turbulence around the guide legs.
Figure 8A:
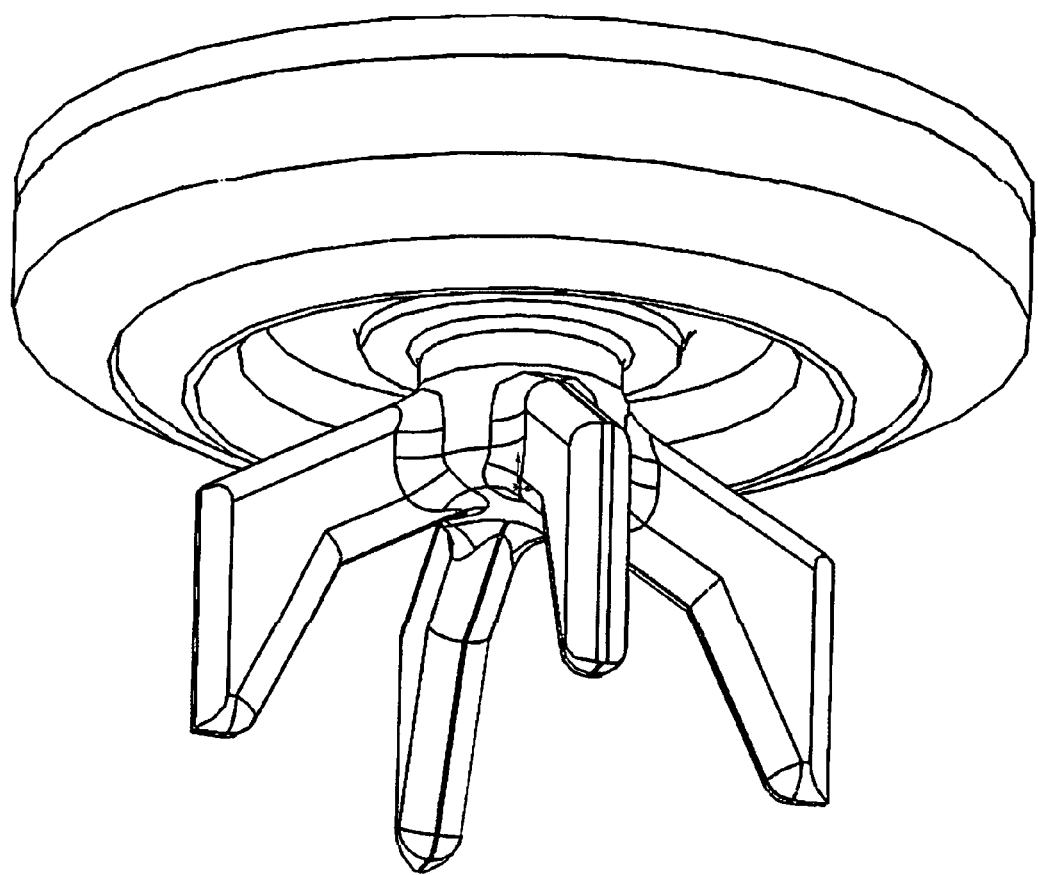
FIG. 8A schematically illustrates the current state of the art valve design in which the guide legs are a streamlined investment casting to provide improved fluid flow.
Figure 8B:
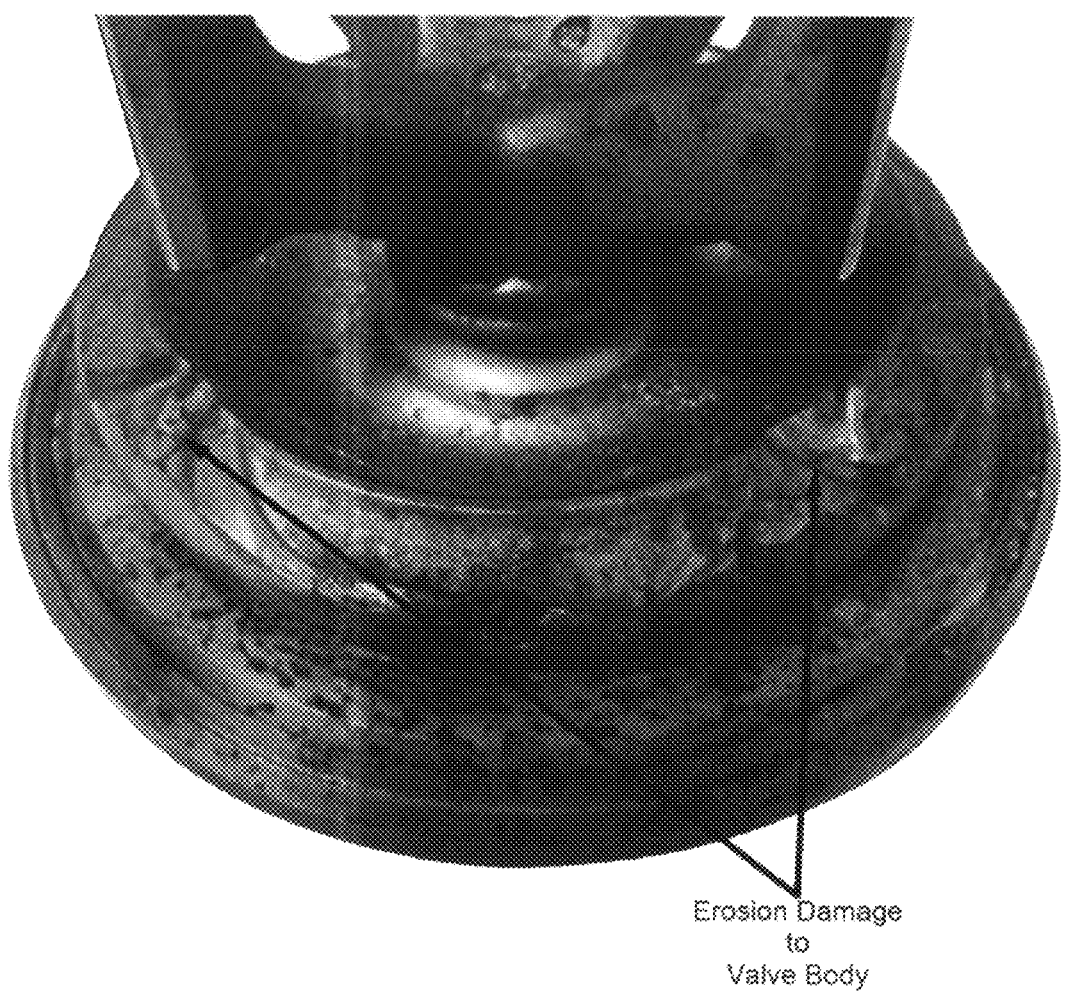
FIG. 8B is a picture of an actual valve of a design schematically illustrated in FIG. 8A and the erosion damage due to turbulent fluid flow.
Figure 9A:
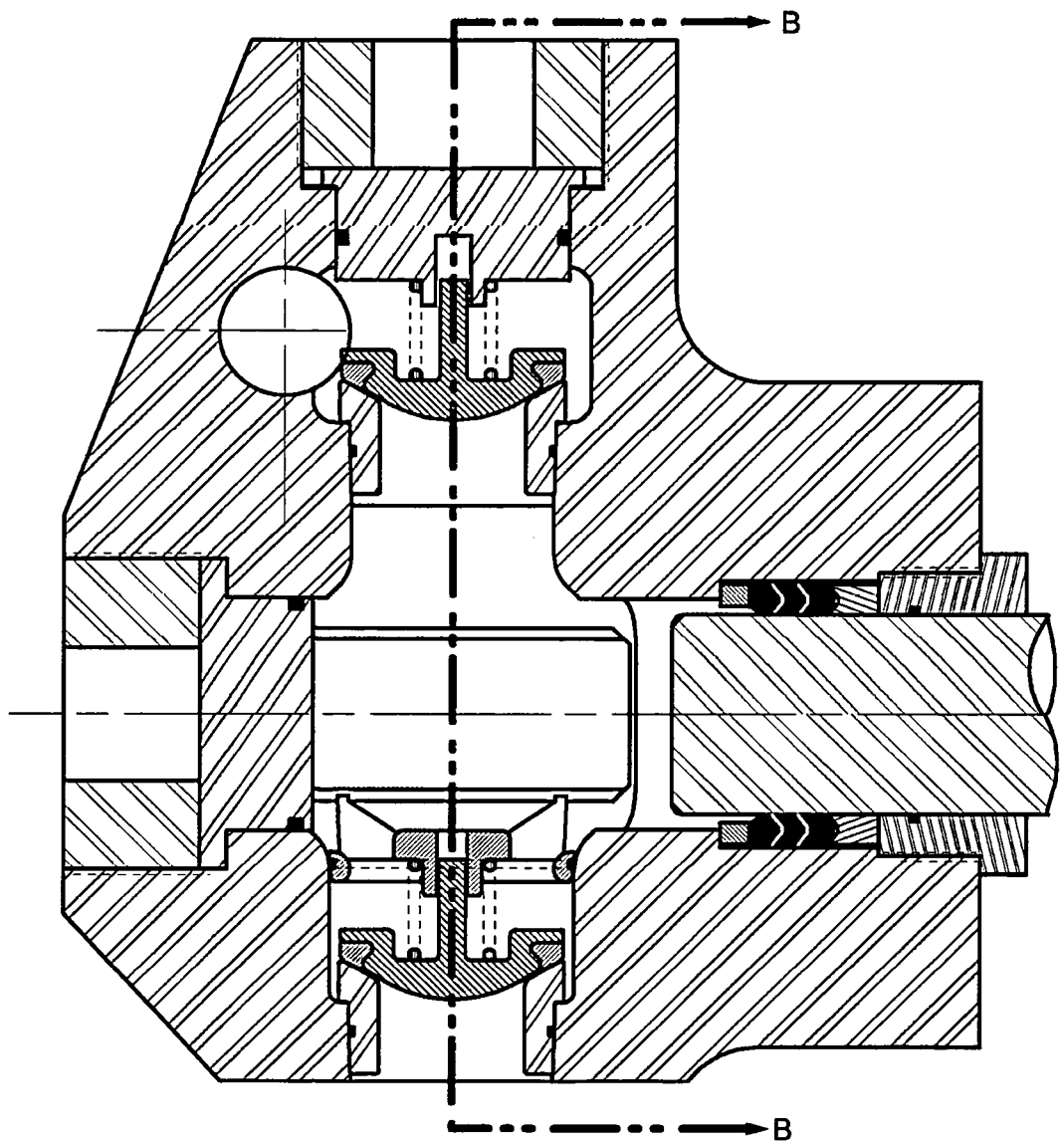
FIG. 9A schematically illustrates a cross-section of a right-angular plunger pump having a top stem guided suction valve and a top stem guided discharge valve.
Figure 9B:
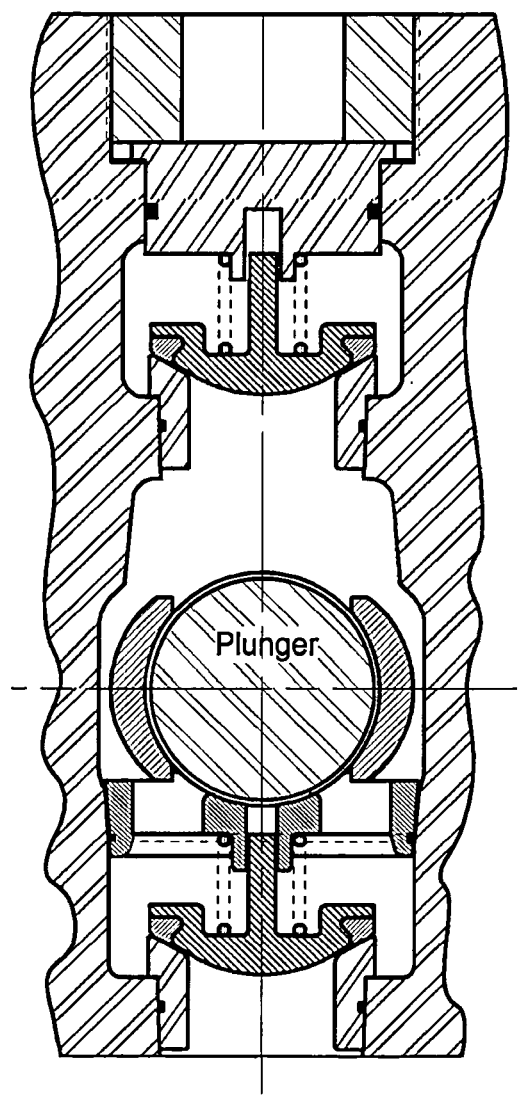
FIG. 9B schematically illustrates the sectional view labeled B-B in FIG. 9A.
Figure 10:
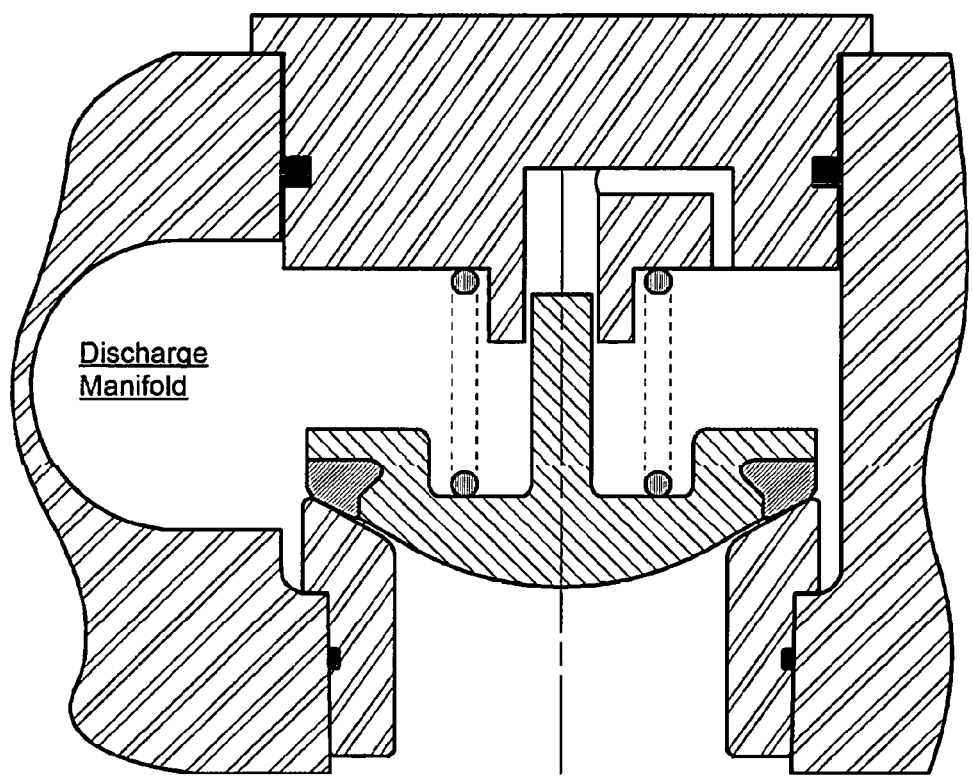
FIG. 10 is a partial cross-section schematically illustrating detail of the top stem guided discharge valve of FIGS. 9A and 9B.
Figure 11A:
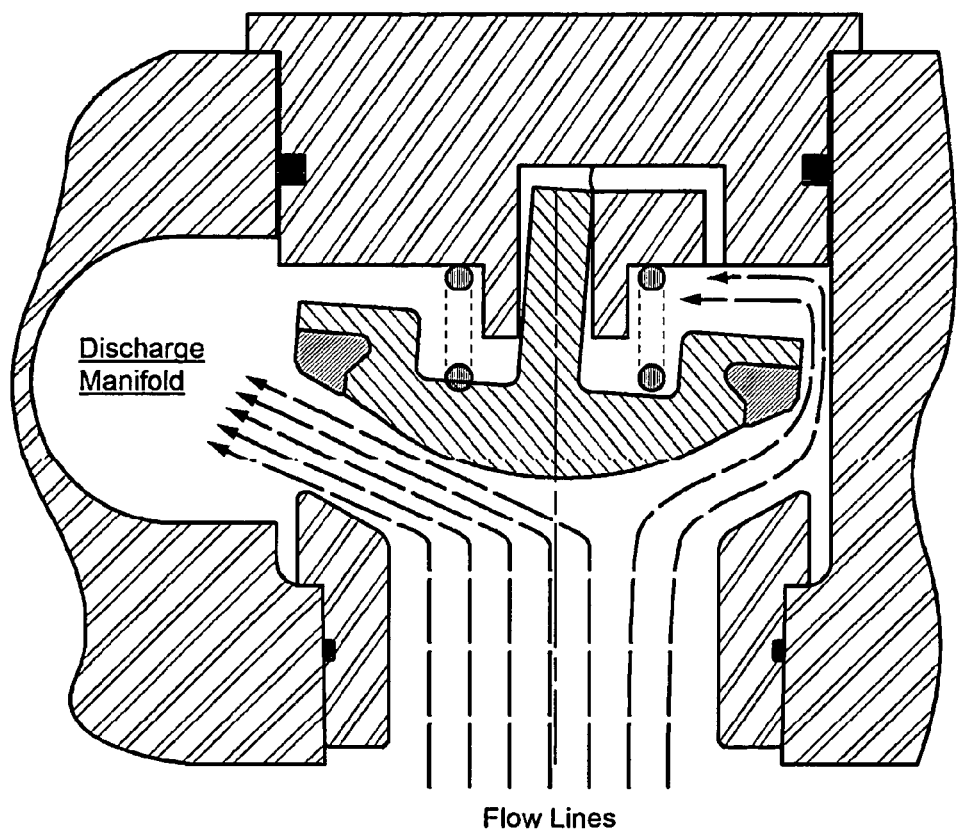
FIG. 11A schematically illustrates flow around a discharge valve with the valve in the full open position.
Figure 11B:
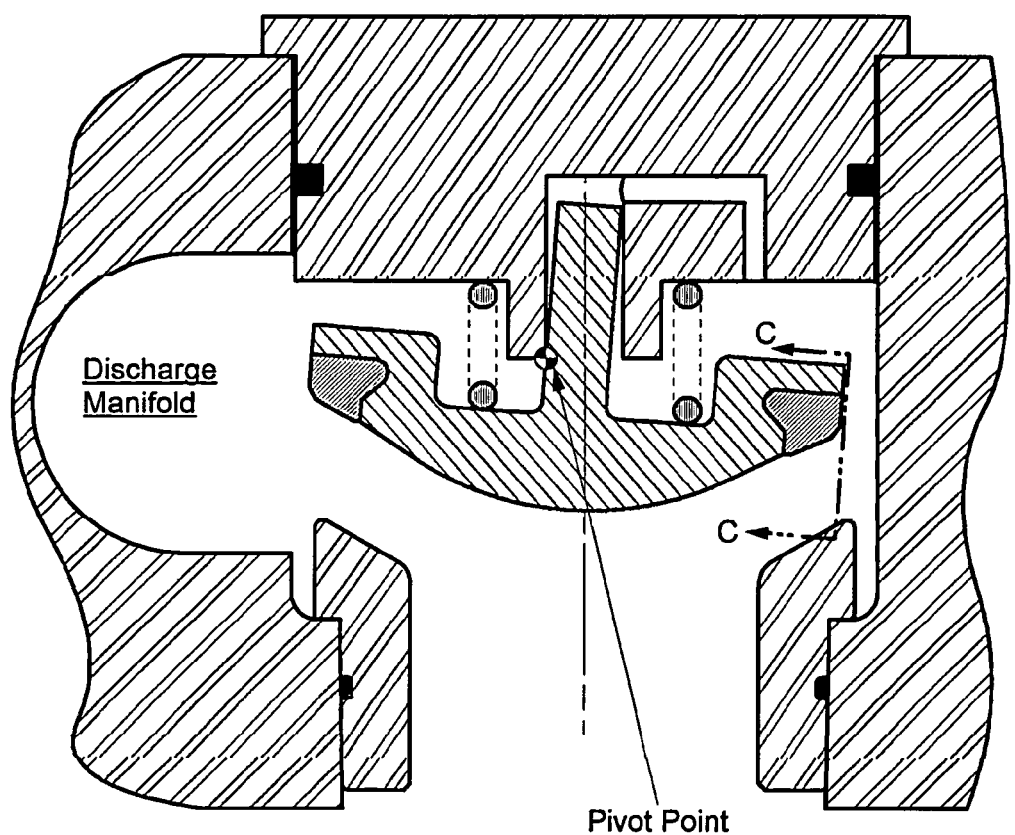
FIG. 11B schematically rotation of the discharge valve body of FIG. 11A.
Figure 11C:
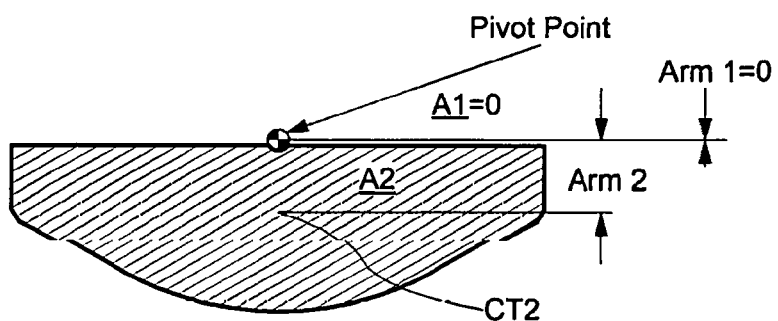
FIG. 11C schematically illustrates a side view of FIG. 11B and the moment applied to the valve by the flow.
Figure 11D:
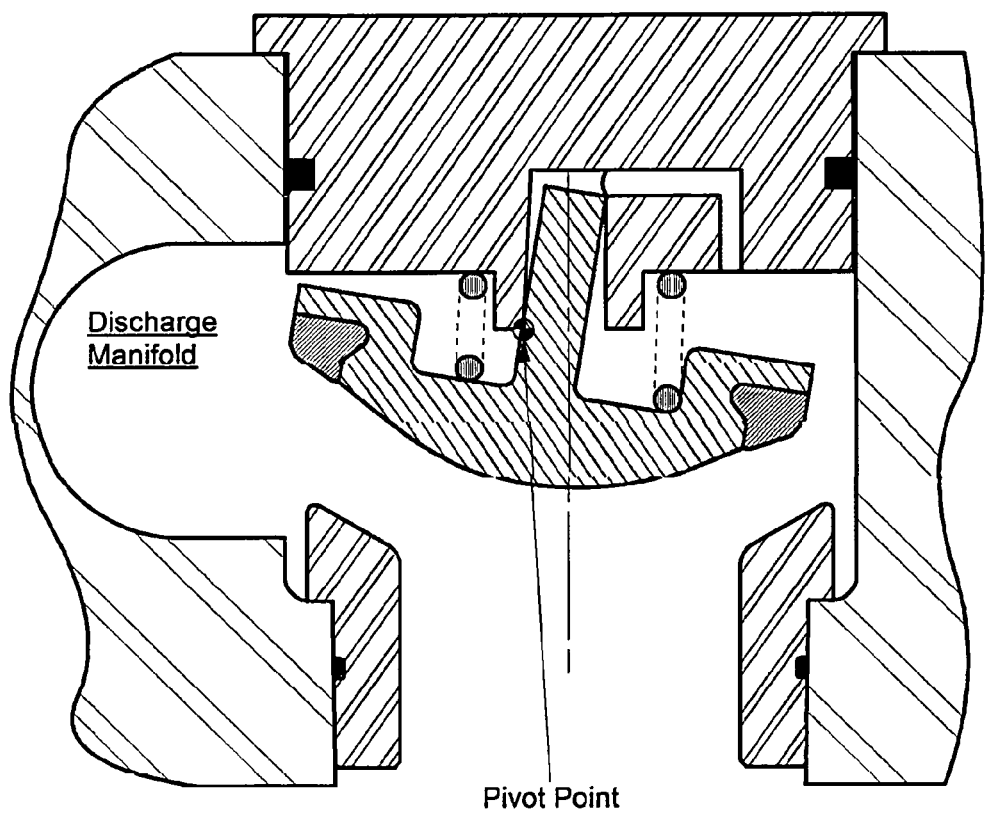
FIG. 11D schematically illustrates extreme rotation of the valve of FIG. 11B due to worn valve guide.
Figure 12:
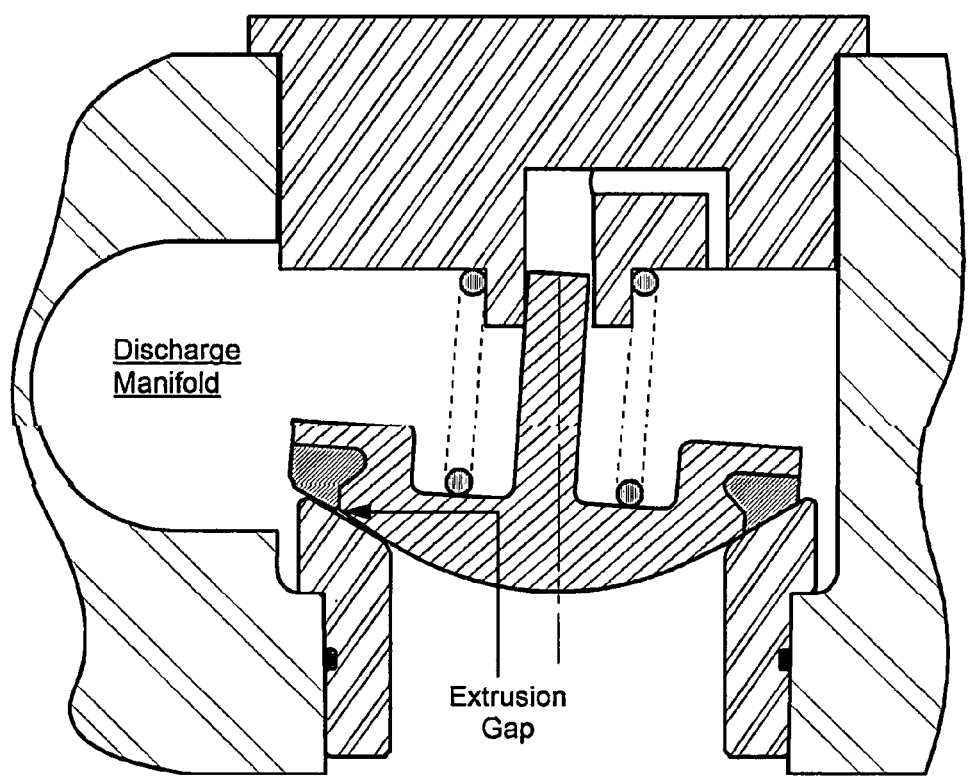
FIG. 12 schematically illustrates improper closure of the discharge valve of FIG. 10 due to unstable misalignment and rotation of the valve.
Figure 13:
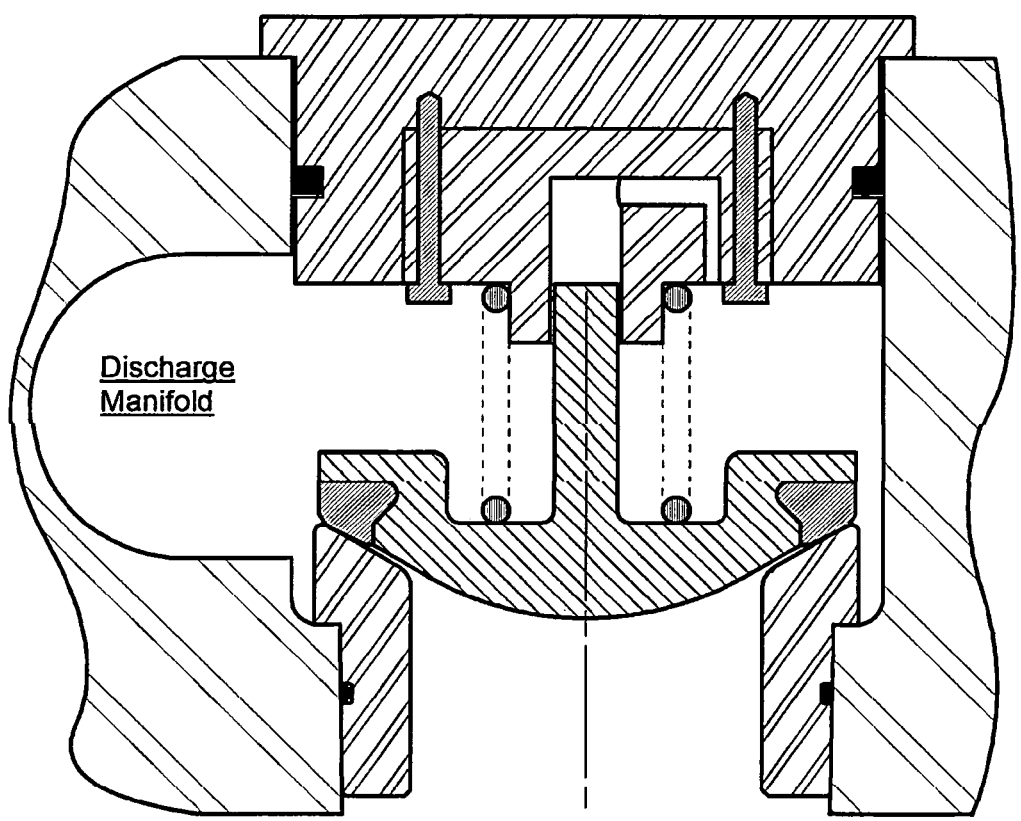
FIG. 13 schematically illustrates a replaceable bushing in a modification of the top valve stem guide shown in FIG. 10.
Figure 14A:
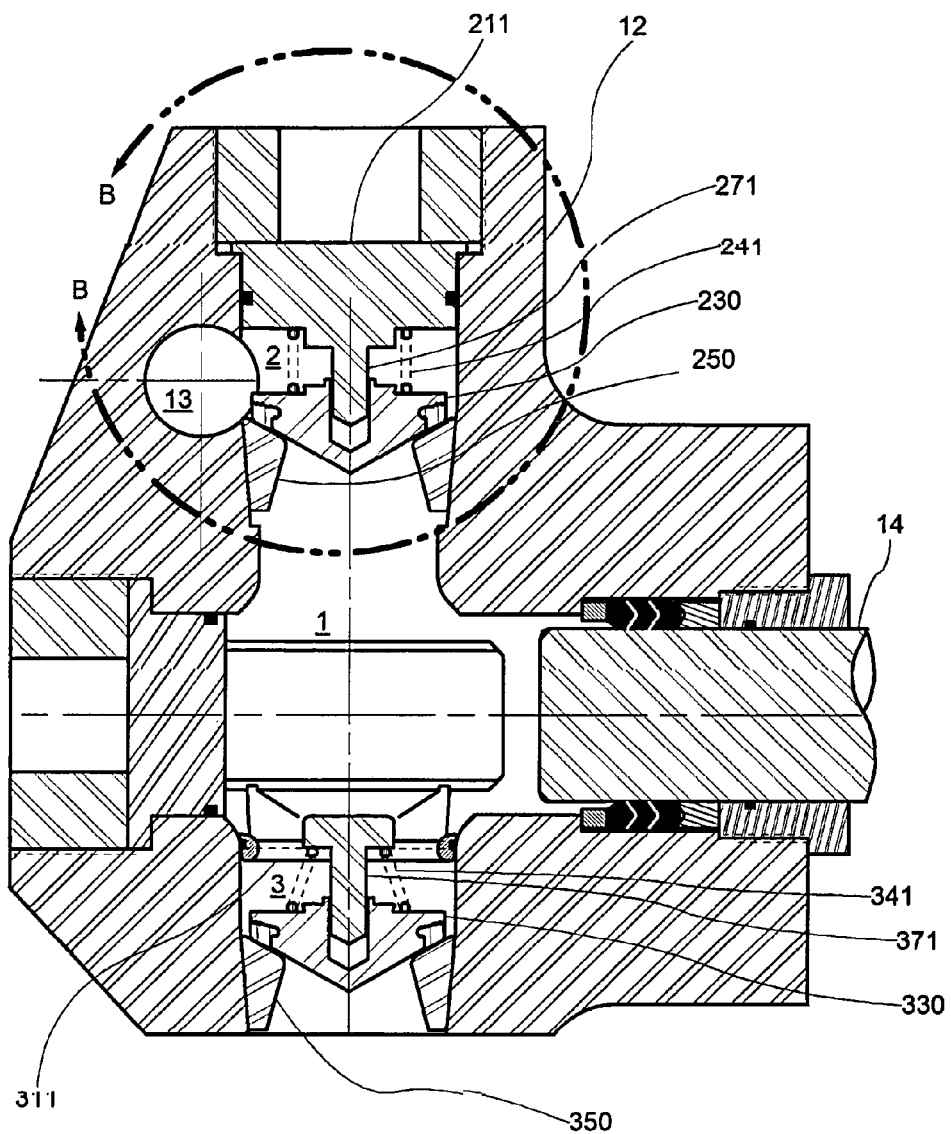
FIG. 14A schematically illustrates a cross-section of a right-angular plunger pump with a fluid chamber having a top stem internally guided suction and discharge valves of the present inventions.

FIG. 14A schematically illustrates a cross-section of a right-angular plunger pump fluid end housing 12, with a fluid chamber 1, having internally guided suction and discharge valves of the present inventions. Fluid Chamber 1 has discharge fluid chamber 2 and a suction chamber 3, wherein discharge fluid chamber 2 contains a discharge seat 250, discharge valve and seal assembly 230, discharge cover 211, male stem guide 271, and a discharge spring 241. Suction fluid chamber 3 contains a suction seat 350, suction valve and seal assembly 330, suction valve spring retainer 311, suction male stem guide 371, and a suction spring 341. Fluid chamber 1 also contains a plunger 14. Discharge fluid chamber 2 is connected to adjacent discharge fluid chambers by a discharge manifold 13.

Figure 14B:
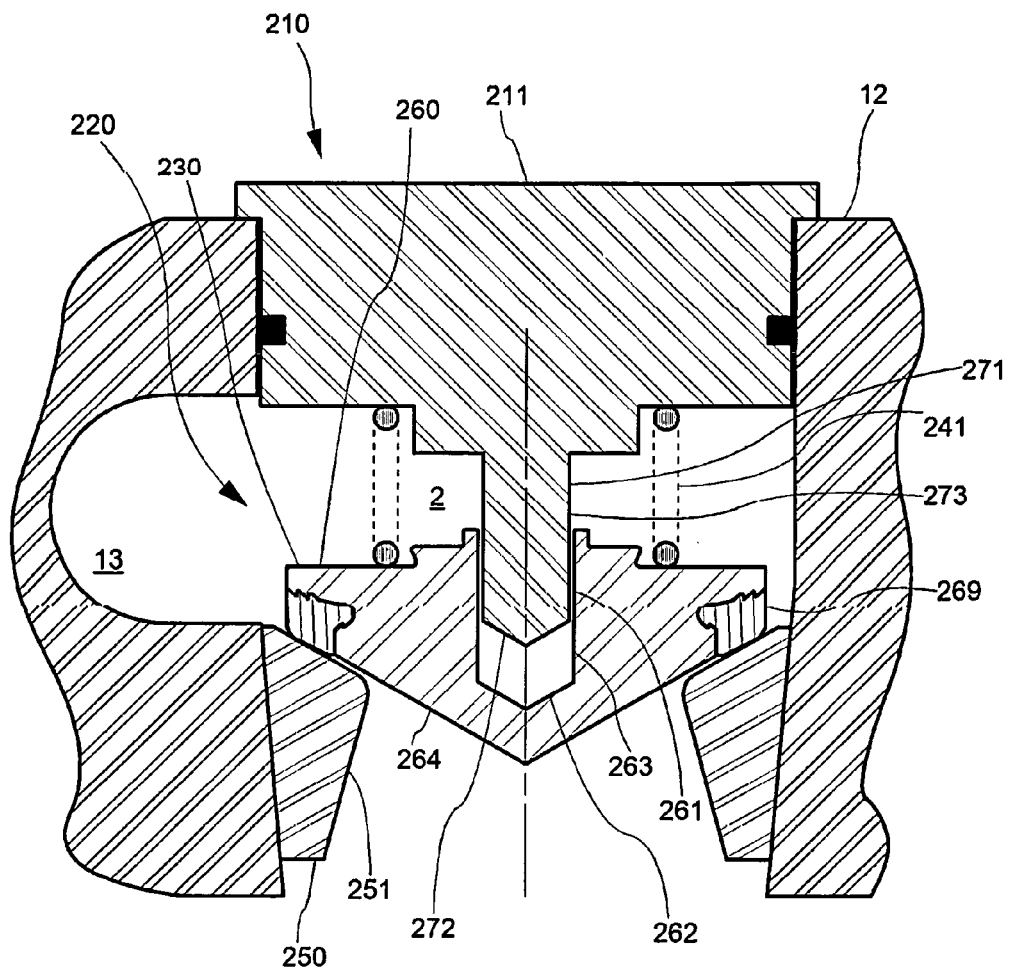
FIG. 14B schematically illustrates an enlargement of Area "B-B" of FIG. 14A according to the present invention.
Figure 15A:
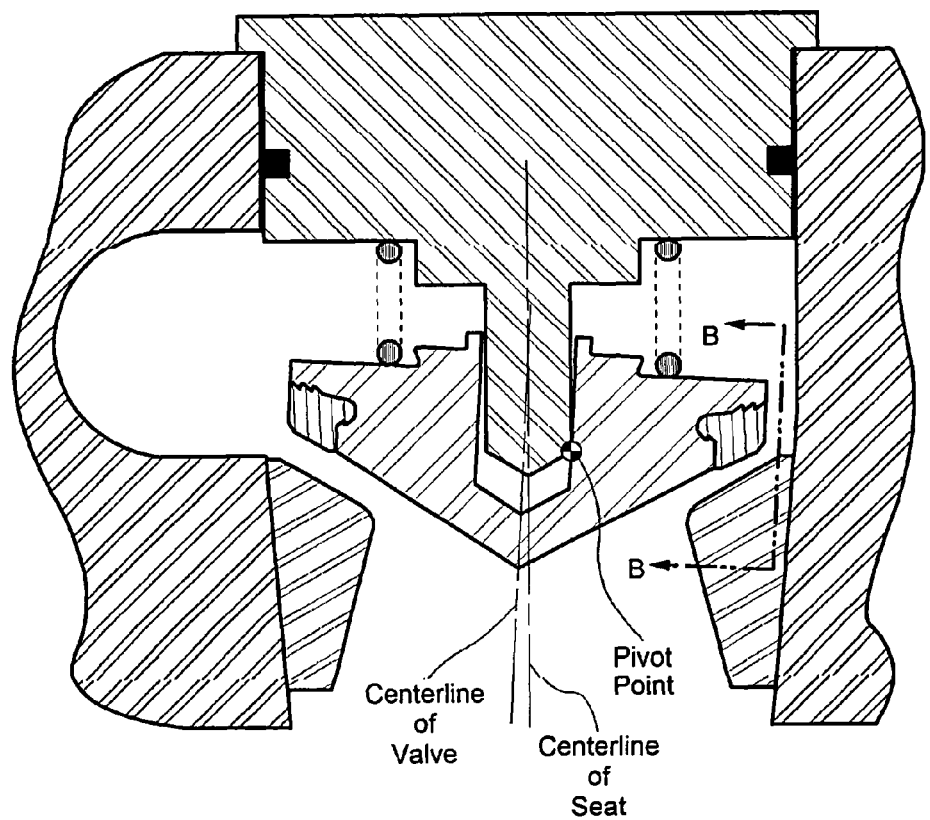
FIG. 15A schematically illustrates the valve of FIG. 14B in the partially opened position in which the valve begins to rotate around the pivot point between the female valve guide integral with the valve body and the male valve guide integral with the discharge cover.
Figure 15B:
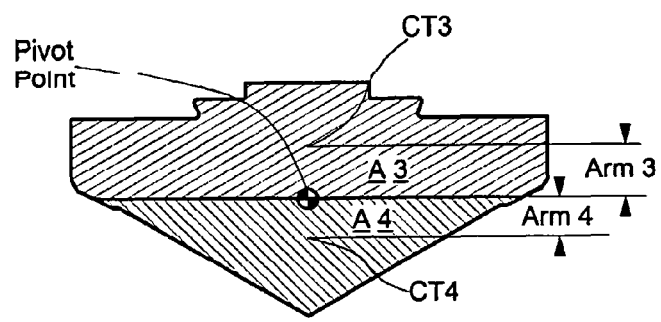
FIG. 15B schematically illustrates a side view of FIG. 15A and the moments applied to the valve by the flow.
Figure 16A:
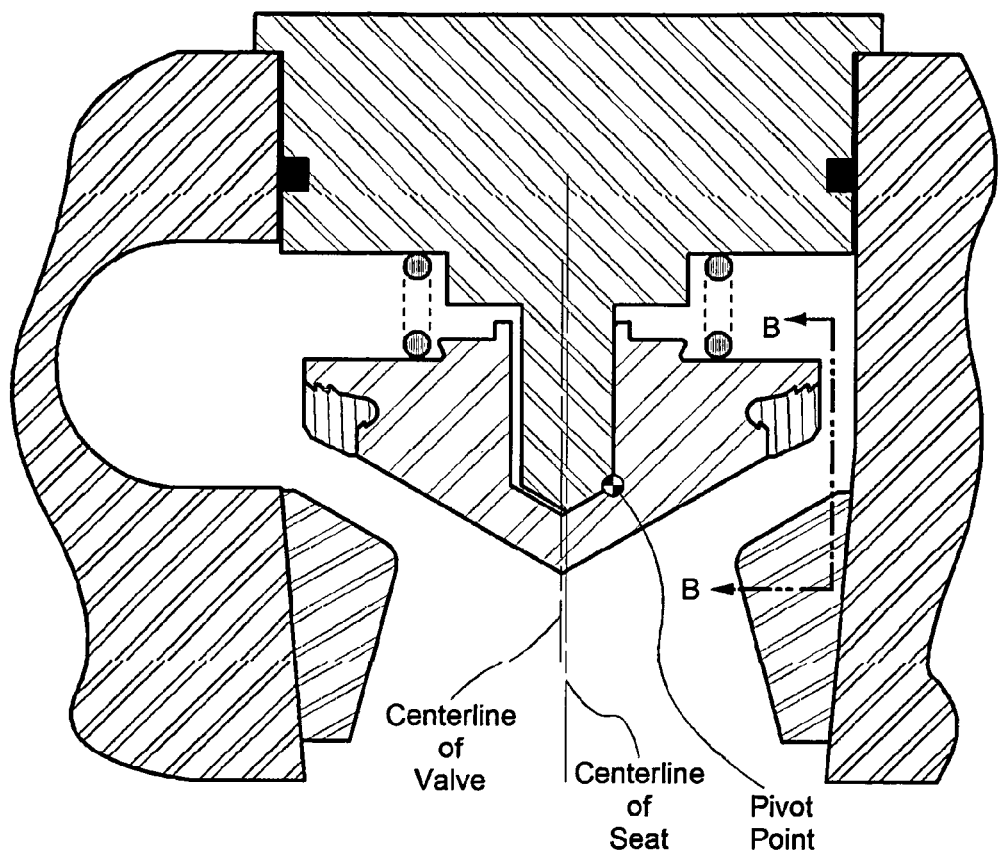
FIG. 16A schematically illustrates the valve of FIG. 14B in the fully opened position and the valve rotated around the pivot point to a position in which the centerline of the valve is aligned with the centerline of the seat.
Figure 16B:
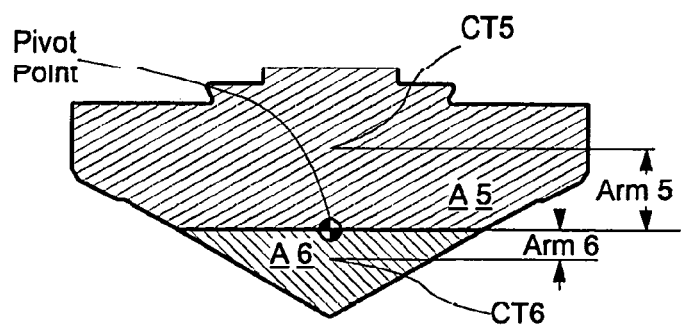
FIG. 16B schematically illustrates a side view of FIG. 16A and the moments applied to the valve by the flow.

FIG. 14B schematically illustrates an embodiment of the present invention. Discharge valve assembly 210 is positioned in the discharge fluid chamber 2, which is one of multiple chambers inside fluid end housing 12. A valve body and seal assembly 230 comprising a top stem internally guided valve body 260 having a elastomeric seal insert 269. Valve body and seal assembly 230 are components of a valve and seat assembly 220 which is composed of seat 250 and valve body and seal assembly 230. Similarly the complete discharge valve assembly 210 includes discharge cover 211, valve spring 241, and valve and seat assembly 220. Valve body 260 has a downstream portion 264 substantially conical in shape and a top or upstream side with an internal stem guide section 261 which is composed of a cylindrical section 263 and a lower section 262. Discharge Cover 211 has an integral male stem guide 271 which has a cylindrical section 273 and a lower section 272 at the bottom of stem guide 271. Seat 250 has venturi throat section 251 for improved flow and reduced fluid turbulence.

Figure 17:
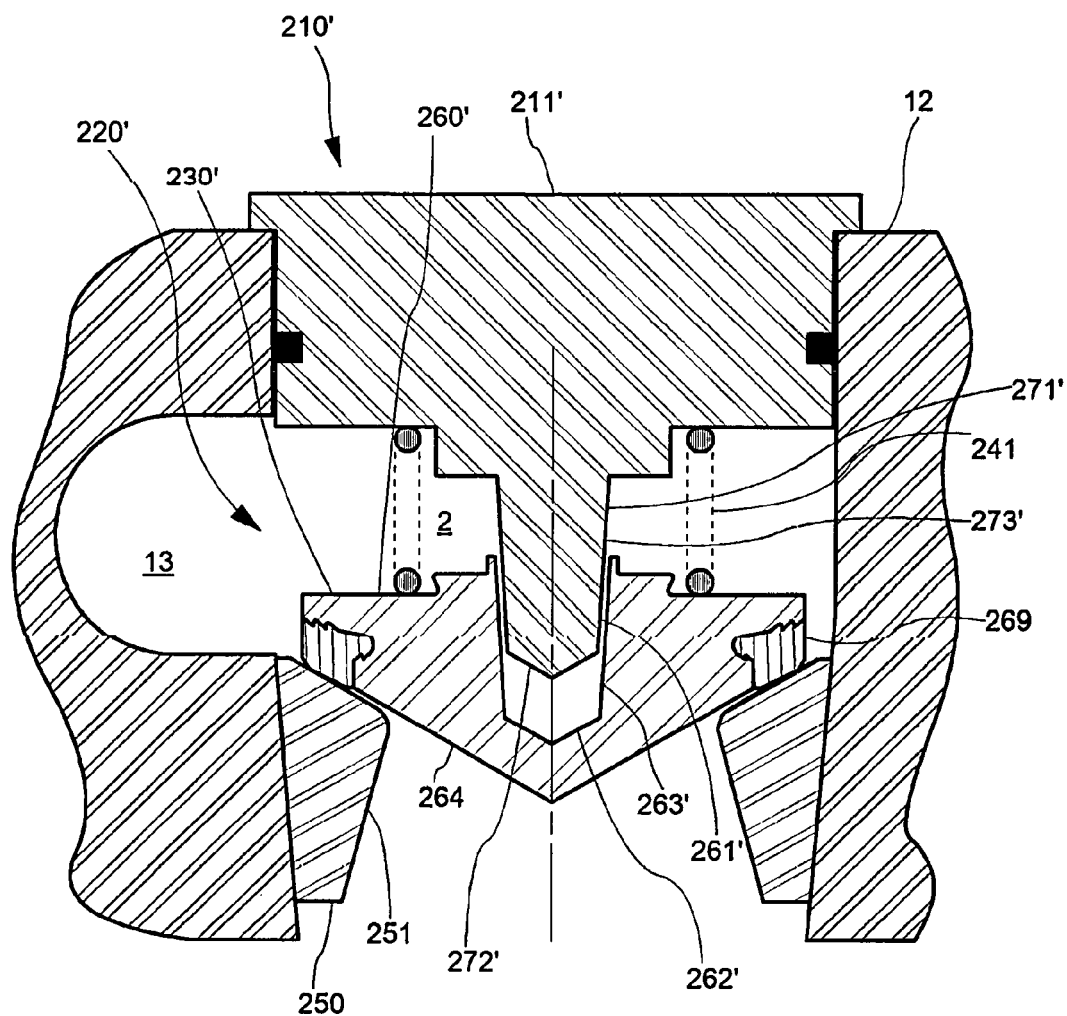
FIG. 17 schematically illustrates an alternate embodiment of the valve of FIG. 14B with a tapered female valve guide integral with the valve body and a tapered male valve guide integral with the discharge cover.
Figure 18A:
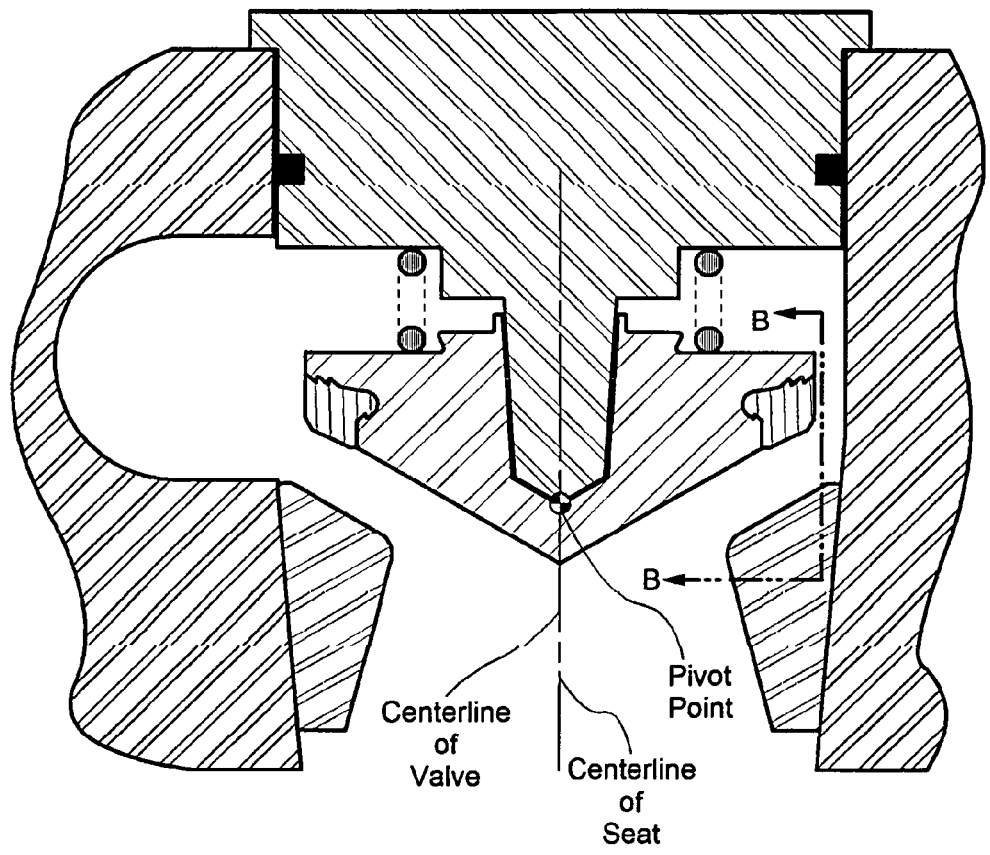
FIG. 18A schematically illustrates the valve of FIG. 17 in the fully opened position and the tapered surfaces of the female and male guides are mated in which the centerline of the valve is collinear with the centerline of the seat.
Figure 18B:
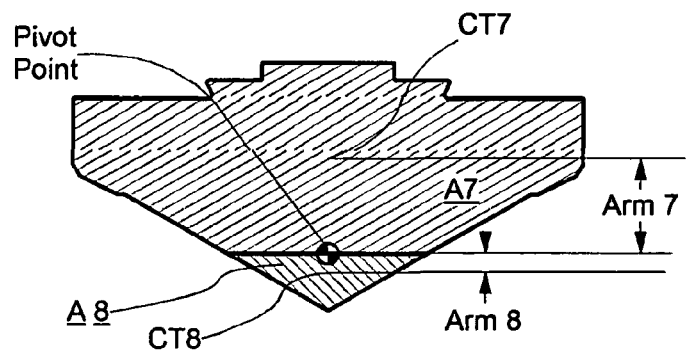
FIG. 18B schematically illustrates a side view of FIG. 18A and the moments applied to the valve by the flow.

FIG. 17 schematically illustrates an embodiment of a valve body and seal assembly 230' comprising a top stem internally guided valve body 260' having an elastomeric seal or insert 269. Valve body and seal assembly 230' are components of a valve and seat assembly 220' which is composed of seat 250 and valve body and seal assembly 230'. Similarly the complete discharge valve assembly 210' includes discharge cover 211', valve spring 241, and valve and seat assembly 220'. Valve body 260' has a downstream portion 264 substantially conical in shape and a top or upstream side with an internal stem guide section 261' which is composed of a tapered section 263' and a lower stem seat section 262'. Discharge Cover 211' has an integral male stem guide 271' which has a tapered body section 273' and a lower complementary seating section 272' at the bottom of stem guide 271', wherein the complementary seating section 272' mates with the stem seat section 262' when the valve stem is in the fully seated position. Seat 250 has venturi throat section 251 for improved flow and reduced fluid turbulence. Fluid End housing 12, fluid chamber 2, and discharge manifold 13 are unchanged from previous embodiments of this application.

Figure 19A:
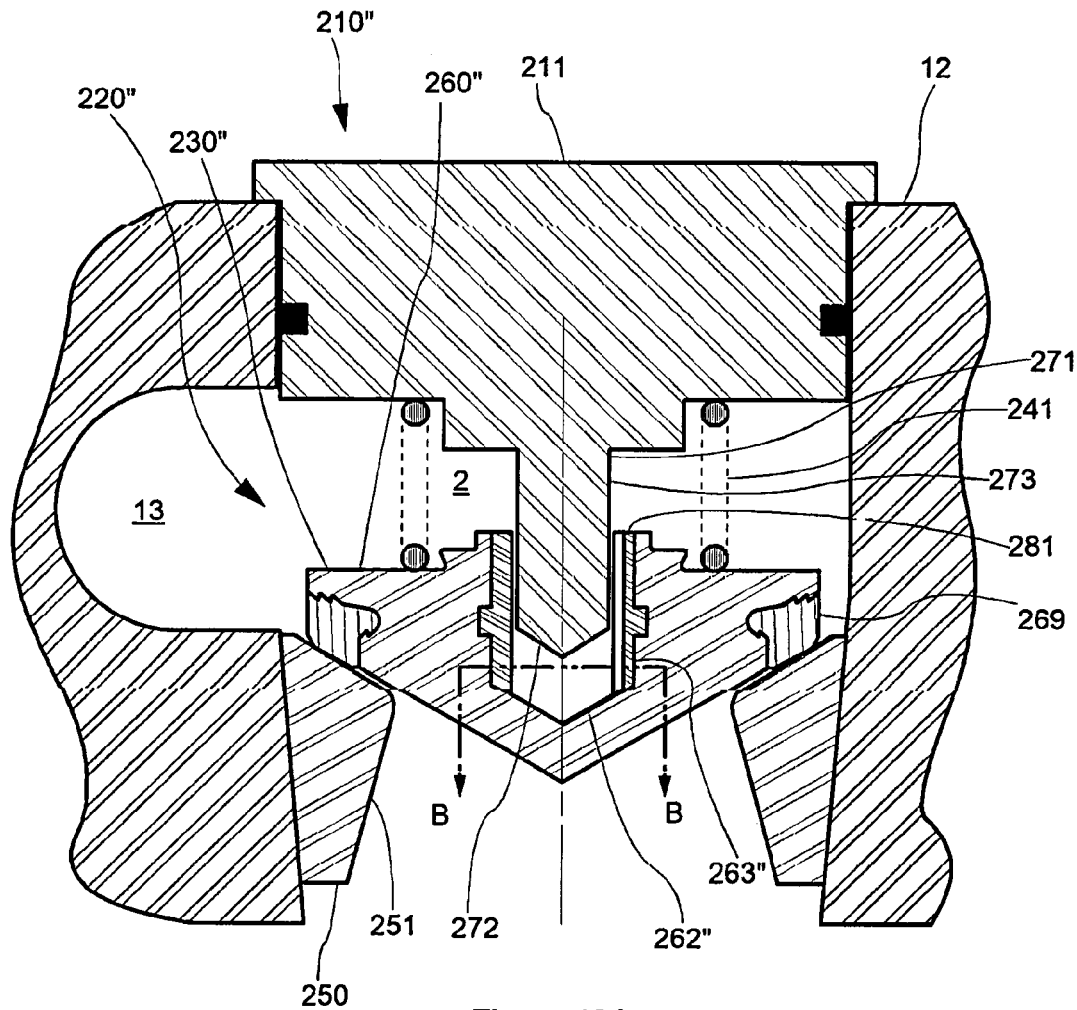
FIG. 19A schematically illustrates an alternate embodiment of a top stem internally guided valve body with an internal guide in which the female portion of the guide has a wear bushing with fluted grooves made according to the present invention.
Figure 19B:
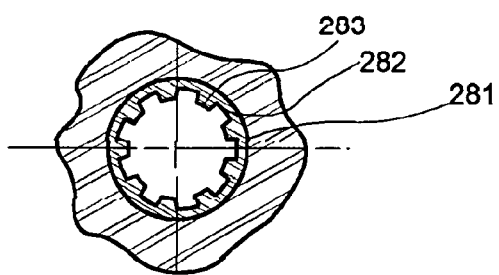
FIG. 19B schematically illustrates the sectional view labeled B-B in FIG. 19A.

FIGS. 19A and 19B schematically illustrates an embodiment of a valve body and seal assembly 230" comprising a top stem internally guided valve body 260" having an elastomeric seal or insert 269 and a female guide member 281. Valve and seat assembly 220" is composed of seat 250 and valve body and seal assembly 230". Similarly the complete discharge valve assembly 210" includes discharge cover 211, valve spring 241, and valve and seat assembly 220". A guide bushing 281 made of a low friction material is pressed or molded into valve body 260". Guide bushing 281 contains two or more longitudinal grooves 282. Guide bushing 281 also contains two or more crests or flats 283 which form the inner most surface of the guide bushing 281. Flat surface 283 slides against male stem guide 271. Discharge Cover 211 is unchanged from the embodiment shown in FIGS. 14A, and 14B with the same male stem guide 271 which has a cylindrical section 273 and a lower section 272 at the bottom of stem guide 271. Valve body 260" has only minor changes from valve body 260 of the embodiment shown in FIGS. 14A and 14B. Lower section 262" is coincidental to lower section 262 of valve body 260 except for the larger major diameter of the conical section 262". The major diameter of the lower section 262" is coincidental with the bottom of cylindrical section 263". Seat 250 has venturi throat section 251 for improved flow and reduced fluid turbulence. Fluid End housing 12, fluid chamber 2, and discharge manifold 13 are unchanged from previous embodiments of this application.

Figure 20:
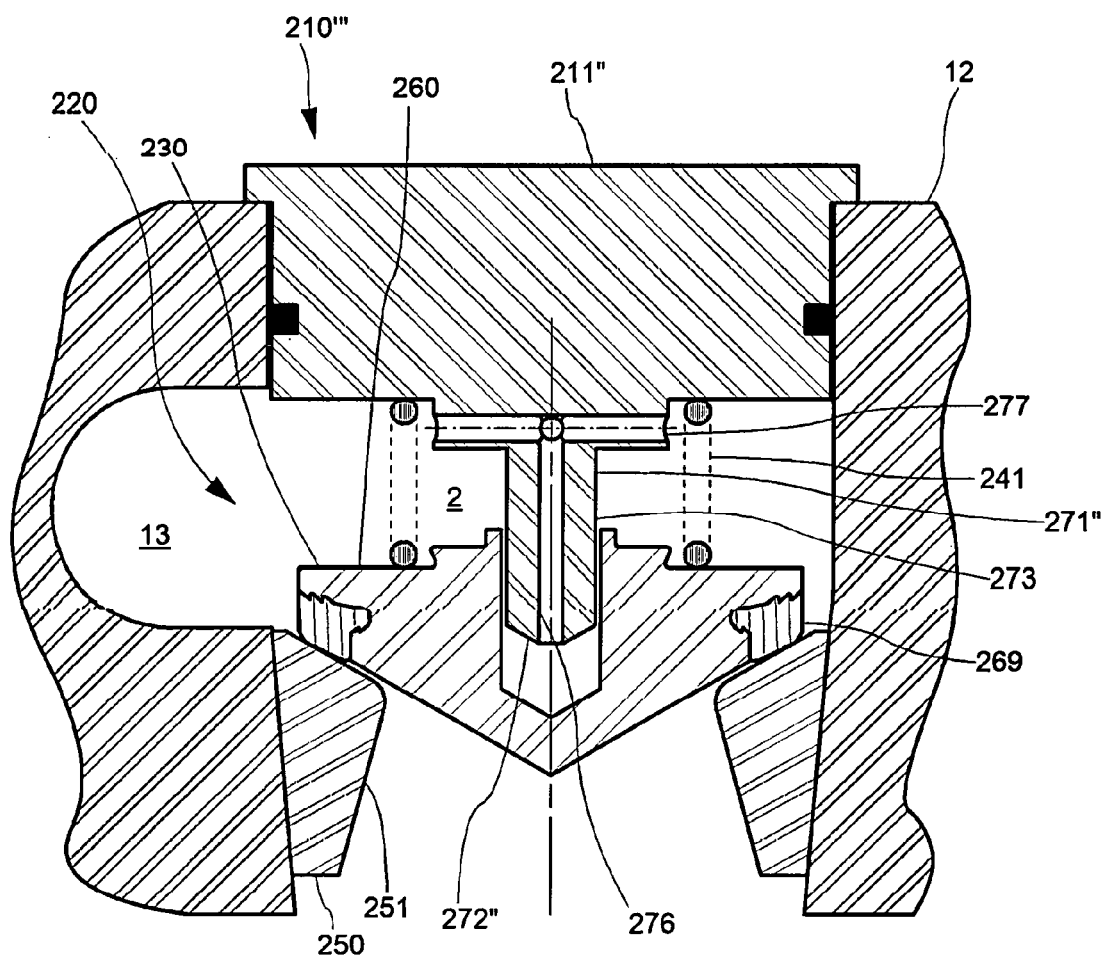
FIG. 20 schematically illustrates an alternate embodiment of a top stem internally guided valve body with an internal guide in which the male portion of the guide is internally vented to relieve trapped fluids between the male guide and the bottom of the female guide.

FIG. 20 schematically illustrates an embodiment of a valve body and seal assembly 230 comprising a top stem internally guided valve body 260 having an elastomeric seal or insert 269. Valve and seat assembly 220 is composed of seat 250 and valve body and seal assembly 230. Similarly the complete discharge valve assembly 210''' includes discharge cover 211", valve spring 241, and valve and seat assembly 220. Discharge Cover 211" has a male guide stem 271" which has a cylindrical section 273, a lower section 272" at the bottom of stem 271", a coaxial vent hole 276 and a least one radial hole 277. Valve body 260 of FIG. 22 are identical to the valve body 220 illustrated in FIGS. 14A and 14B with the same or similar downstream portion 264 substantially conical in shape and a top or upstream side with an internal stem guide section 261 which is composed of a cylindrical section 263 and a lower section 262. Seat 250 has venturi throat section 251 for improved flow and reduced fluid turbulence. Fluid End housing 12, fluid chamber 2, and discharge manifold 13 are unchanged from previous embodiments of this application.

Figure 21:
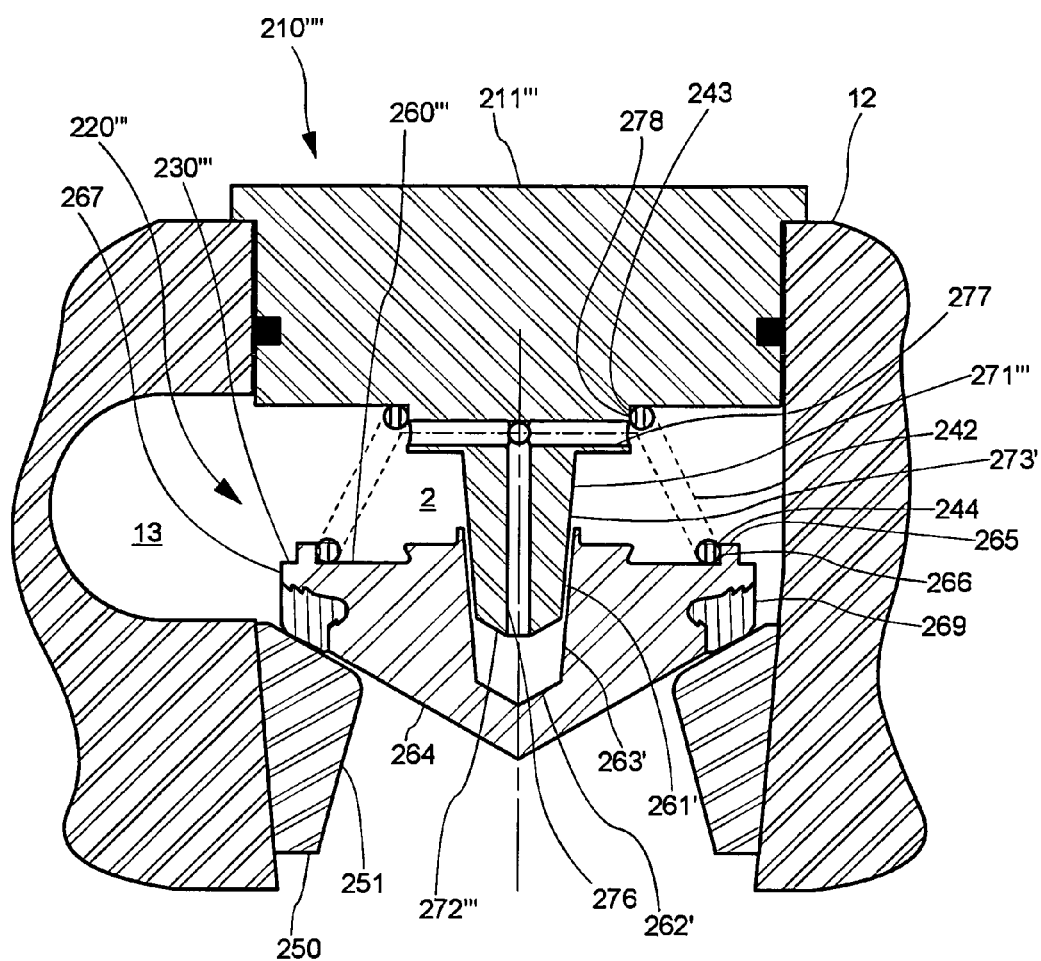
FIG. 21 schematically illustrates an alternate embodiment of a top stem internally guided valve body with an internal guide wherein guidance is enhanced with the addition of close fitting conical spring.

FIG. 21 schematically illustrates an embodiment of a valve body and seal assembly 230''' comprising a top stem internally guided valve body 260''' having an elastomeric seal or insert 269. Valve and seat assembly 220' is composed of seat 250 and valve body and seal assembly 230'''. Similarly the complete discharge valve assembly 210'''' includes discharge cover 211''', a conical valve spring 242, and valve and seat assembly 220'''. Discharge Cover 211''' has a male guide stem 271''' which has a tapered section 273' and a lower section 272''' at the bottom of stem guide 271''', a coaxial vent hole 276 and a least one radial hole 277. Radial hole 277 is located in a substantially cylindrical boss 278 at base of tapered section 271'''. Valve body 260''' has a downstream portion 264 substantially conical in shape and a top or upstream side with an internal stem guide section 261' which is composed of a tapered section 263' and a lower section 262'. Valve body 260''' has an integral ring 265 on the top portion of valve body 260'''; said ring 265 being located at or near outer most substantially cylindrical surface 267 of valve body 260'''. Boss 278 may be conical to aid in installation of spring 242 over said boss 278. Conical spring 242 has an inside surface 243 that fits around boss 278 of discharge cover 211'''. Conical Spring 242 also has a large end with an outside surface 244 that fits against inside surface 266 of ring 265 that is integral to valve body 260'''. In some embodiments, spring 242 is fitted with a small interference fit around boss 278 and inside valve body ring 267. With said interference fit, said spring 242 functions as a guide that augments the guidance of the reciprocal motion of the valve 230''' of this invention. In the preferred embodiment the interference fit of said spring around boss 278 and inside valve body ring 278 ranges between 0.00 and 0.06 inches measured on the diameter.

Seat 250 illustrated in FIG. 21 has venturi throat section 251 for improved flow and reduced fluid turbulence. Fluid End housing 12, fluid chamber 2, and discharge manifold 13 are unchanged from previous embodiments of this application.

What is claimed is:

1. A positive displacement pump fluid end having at least one fluid chamber, comprising:
   a valve seat;
   a valve body configured to be received in said valve seat to form a fluid seal therewith, said valve body comprising a tapered internal guide bore having a first taper and a stem seat section at a distal end of said internal guide bore;
   a tapered guide rod, having tapered body section comprising a second taper complimentary to said first taper and a seating end section shaped to mate with said stem seat section when the valve is in the fully opened position, said tapered guide rod secured to a component of said fluid end, said tapered guide rod received in said tapered internal guide bore of said valve body to provide support for reciprocal motion of said valve body along a predetermined axis; and
   a spring providing a biasing force to force said valve body toward a closed position with said valve seat.

2. The pump fluid end of claim 1, wherein said spring has a substantially rectangular cross-section.

3. The pump fluid end of claim 1, wherein said spring has a substantially conical cross-section.

4. The pump fluid end of claim 1, wherein said seating end section of said tapered guide rod has a conical configuration and is configured to be received in a corresponding conical seating section of said tapered guide bore of said valve body.

5. The pump fluid end of claim 1, wherein said tapered guide rod comprises a coaxial vent hole that connects with surrounding space for fluid movement.

6. The pump fluid end of claim 1, wherein said valve body comprises a wear bushing.

7. The pump fluid end of claim 1, wherein said valve seat comprises an internal venturi throat section.

8. A positive displacement pump fluid end having at least one fluid chamber, comprising:
   a valve seat;
   a valve body configured to be received in said valve seat to form a fluid seal therewith, said valve body comprising a tapered internal guide bore having a first taper and a stem seat section at a distal end of said internal guide bore;
   a tapered guide rod, having tapered body section comprising a second taper complimentary to said first taper and a seating end section shaped to mate with said stem section when said valve seat is in the fully opened position, said tapered guide rod secured to a component of said fluid end, said tapered guide rod received in said tapered internal guide bore of said valve body to provide support for reciprocal motion of said valve body along a predetermined axis; and
   a spring providing a biasing force to force said valve body toward a closed position with said valve seat;
   wherein: said spring is fitted adjacent to and around a boss at the base of the stem guide and also fitted inside an integral ring on top of the valve.

9. The pump fluid end of claim 8, wherein said spring has a substantially conical cross-section.

10. The pump fluid end of claim 8, wherein said spring is fitted with an interference fit around a boss at the base of the stem guide and inside an integral ring on top of the valve; wherein said interference fit measures between 0.00 and 0.06 inches on the diameter.

11. The pump fluid end of claim 8, wherein said seating end section of said tapered guide rod has a conical configuration and is configured to be received in a corresponding conical seating section of said tapered guide bore of said valve body.

12. The pump fluid end of claim 8, wherein said tapered guide rod comprises a coaxial vent hole that connects with surrounding space for fluid movement.

13. The pump fluid end of claim 8, wherein said valve body comprises a wear bushing.

14. The pump fluid end of claim 8, wherein said valve seat comprises an internal venturi throat section.

* * * * *